United States Patent
Hall

(10) Patent No.: US 8,355,410 B2
(45) Date of Patent: Jan. 15, 2013

(54) LOCATION-BASED MOBILE GAMING APPLICATION AND METHOD FOR IMPLEMENTING THE SAME USING A SCALABLE TIERED GEOCAST PROTOCOL

(75) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 322 days.

(21) Appl. No.: 12/835,385

(22) Filed: Jul. 13, 2010

(65) Prior Publication Data

US 2010/0279776 A1    Nov. 4, 2010

Related U.S. Application Data

(63) Continuation-in-part of application No. 11/893,813, filed on Aug. 17, 2007, and a continuation-in-part of application No. 12/220,598, filed on Jul. 25, 2008, now Pat. No. 7,969,914, and a continuation-in-part of application No. 12/404,811, filed on Mar. 16, 2009.

(60) Provisional application No. 61/258,167, filed on Nov. 4, 2009.

(51) Int. Cl.
  *H04J 3/26* (2006.01)
  *A63F 13/00* (2006.01)

(52) U.S. Cl. .......................................... 370/432; 463/39

(58) Field of Classification Search ........................ None
  See application file for complete search history.

(56) References Cited

U.S. PATENT DOCUMENTS

| | | | |
|---|---|---|---|
| 6,015,344 | A | 1/2000 | Kelly et al. |
| 6,304,556 | B1 | 10/2001 | Haas |
| 6,628,620 | B1 | 9/2003 | Cain |
| 6,781,971 | B1 | 8/2004 | Davis et al. |
| 6,807,165 | B2 | 10/2004 | Belcea |
| 6,816,460 | B1 | 11/2004 | Ahmed et al. |
| 6,870,846 | B2 | 3/2005 | Cain |
| 6,879,574 | B2 | 4/2005 | Naghian et al. |
| 6,909,706 | B2 | 6/2005 | Wilmer et al. |
| 6,937,602 | B2 | 8/2005 | Whitehill et al. |
| 6,940,832 | B2 | 9/2005 | Saadawi et al. |
| 6,954,435 | B2 | 10/2005 | Billhartz et al. |
| 6,958,986 | B2 | 10/2005 | Cain |
| 7,027,822 | B1 | 4/2006 | Hwang et al. |
| 7,152,110 | B2 | 12/2006 | Pierce |
| 7,179,166 | B1 | 2/2007 | Abbott |
| 7,197,326 | B2 | 3/2007 | Acampora |
| 7,295,521 | B2 | 11/2007 | Choi et al. |

(Continued)

OTHER PUBLICATIONS

Social + Gaming—SWiK: http://swik.net/social+gaming.

(Continued)

*Primary Examiner* — Anh-Vu Ly
(74) *Attorney, Agent, or Firm* — Woodcock Washburn LLP

(57) ABSTRACT

A method is disclosed for initiating real-time geo-game using geocast messaging according to a scalable tiered geocast protocol. The method includes a first wireless terminal (WT), programmed with a geo-gaming application and the scalable tiered geocast protocol, geocasting a game declaration to a destination geocast region containing potential participants. The method also includes a second WT, of one of the potential participants, and programmed with the geo-gaming application and the scalable tiered geocast protocol, receiving the game declaration in the destination geocast region and responding by geocasting a response message indicating interest in participating in the real-time geo-game.

19 Claims, 9 Drawing Sheets

U.S. PATENT DOCUMENTS

| | | | |
|---|---|---|---|
| 7,307,978 | B2 | 12/2007 | Carlson |
| 7,525,933 | B1 | 4/2009 | Hall |
| 7,613,467 | B2 | 11/2009 | Fleischman |
| 7,813,326 | B1 | 10/2010 | Kelm et al. |
| 7,917,169 | B1 | 3/2011 | Hall |
| 7,969,914 | B1 | 6/2011 | Gerber |
| 7,970,749 | B2 | 6/2011 | Uhlir et al. |
| 8,085,813 | B2 | 12/2011 | Melick et al. |
| 8,248,367 | B1 * | 8/2012 | Barney et al. .................. 463/37 |
| 2002/0141454 | A1 | 10/2002 | Muniere |
| 2002/0155846 | A1 | 10/2002 | Shiraga |
| 2002/0163912 | A1 | 11/2002 | Carlson |
| 2002/0167960 | A1 | 11/2002 | Garcia-Luna-Aceves |
| 2003/0193394 | A1 | 10/2003 | Lamb |
| 2003/0235158 | A1 | 12/2003 | Lee |
| 2004/0213270 | A1 | 10/2004 | Su et al. |
| 2005/0058151 | A1 | 3/2005 | Yeh |
| 2005/0096065 | A1 | 5/2005 | Fleischman |
| 2005/0152318 | A1 | 7/2005 | Elbatt et al. |
| 2005/0152378 | A1 | 7/2005 | Bango et al. |
| 2005/0254453 | A1 | 11/2005 | Barneah |
| 2005/0259597 | A1 | 11/2005 | Benedetto |
| 2006/0013154 | A1 | 1/2006 | Choi et al. |
| 2006/0023677 | A1 | 2/2006 | Labrador |
| 2006/0084444 | A1 | 4/2006 | Kossi et al. |
| 2006/0126535 | A1 | 6/2006 | Sherman |
| 2006/0128349 | A1 | 6/2006 | Yoon |
| 2006/0148516 | A1 | 7/2006 | Reddy et al. |
| 2006/0153157 | A1 | 7/2006 | Roh et al. |
| 2006/0165015 | A1 | 7/2006 | Melick et al. |
| 2007/0008925 | A1 | 1/2007 | Dravida et al. |
| 2007/0019594 | A1 | 1/2007 | Perumal et al. |
| 2007/0110092 | A1 | 5/2007 | Kangude et al. |
| 2007/0217346 | A1 | 9/2007 | Zheng |
| 2007/0259716 | A1 | 11/2007 | Mattice et al. |
| 2007/0259717 | A1 | 11/2007 | Mattice et al. |
| 2007/0263571 | A1 | 11/2007 | Hermann et al. |
| 2007/0265088 | A1 | 11/2007 | Nakada et al. |
| 2007/0266396 | A1 | 11/2007 | Estermann |
| 2007/0287437 | A1 | 12/2007 | Cartmell |
| 2008/0080401 | A1 | 4/2008 | Ribiere |
| 2008/0144493 | A1 | 6/2008 | Yeh |
| 2008/0159236 | A1 | 7/2008 | Ch'ng |
| 2008/0163355 | A1 * | 7/2008 | Chu .............................. 726/12 |
| 2008/0192737 | A1 | 8/2008 | Miyazaki |
| 2009/0041039 | A1 | 2/2009 | Bear |
| 2009/0045977 | A1 | 2/2009 | Bai et al. |
| 2009/0046628 | A1 | 2/2009 | Hall |
| 2009/0138353 | A1 | 5/2009 | Mendelson |
| 2009/0175223 | A1 | 7/2009 | Hall |
| 2009/0201860 | A1 | 8/2009 | Sherman et al. |
| 2009/0245518 | A1 | 10/2009 | Bae et al. |
| 2009/0248420 | A1 | 10/2009 | Basir |
| 2010/0029245 | A1 | 2/2010 | Wood et al. |
| 2010/0067451 | A1 | 3/2010 | Hall |
| 2010/0082513 | A1 | 4/2010 | Liu |
| 2010/0214987 | A1 * | 8/2010 | Mori ............................. 370/328 |
| 2010/0248843 | A1 * | 9/2010 | Karsten .......................... 463/43 |
| 2010/0304759 | A1 | 12/2010 | Leppanen et al. |
| 2010/0329463 | A1 | 12/2010 | Ratliff et al. |
| 2011/0081973 | A1 | 4/2011 | Hall |
| 2011/0102459 | A1 | 5/2011 | Hall |
| 2011/0103302 | A1 | 5/2011 | Hall |
| 2011/0105151 | A1 | 5/2011 | Hall |
| 2012/0058814 | A1 * | 3/2012 | Lutnick et al. .................. 463/25 |
| 2012/0079080 | A1 * | 3/2012 | Pishevar ....................... 709/220 |
| 2012/0094770 | A1 | 4/2012 | Hall |

OTHER PUBLICATIONS http://askville.amazon.com/Wi-games-play-Internet-Family/AnswerViewer.do?requestId=6796582 (2007).

Schutzberg, Adena: "Phone-based GPS-based Games: Missing Pieces"; http://www.directionsmag.com/article.php?article_id=939 (Aug. 17, 2005).

"Boost Mobile Introduces First Location-Based, GPS Games in U.S."; http://www.physorg.com/news5824.html (Aug. 16, 2005).

"Sony bigwig hints at GPS-enabled PSP games"; http://www.vespacious.com/sony-bigwig-hints-at-gps-enabled-psp-games.html (Dec. 22, 2008).

Steve: "GPS-enabled Cell Phone Games"; http://www.strangenewproducts.com/2005/08/gps-enabled-cell-phone-games.html (Aug. 15, 2005).

"Locatoin-Enabled Mobile Gaming"; http://www.nn4d.com/site/global/market/affiliate_sites/lbsglobe/lbsapplications/mobilegaming.jsp (2007).

U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Hall.

Ko et al., "Geocasting in Mobile Ad Hoc Networks: Location-based Multicast Algorithms", Technical Report TR-98-018 Texas A&M University, Sep. 1998.

Ko, et al., "Flooding-Based Geocasting Protocols for Mobile Ad Hoc Networks," Mobile Networks and Applications, Dec. 2002, 7, 471-480.

Hall et al., "A Two-Level Quality of Service Scheme for Collision based on Mobile Ad Hoc Networks", IEEE, 1-4244-1513-06/07, 2007, 8 pages.

Hall, "RTEQ: Modeling and Validating Infinite-State Hard-Real-Time Systems", AT&T Labs Research, ASE 2007, Nov. 2007, 4 pages.

Hall, "Cheating Attacks and Resistance Techniques in Geogame Design," Proc. 2010 ACM FuturePlay Symposium, 2010, 82-89.

Hall, "An Improved Geocast for Mobile Ad Hoc Networking," IEEE Transactions on Mobile Computing, 2010, 1-14.

Illyas, "Body Personal, and Local Ad Hoc Wireless Networks", Chapter 1, CRC Press, 2003, 22 pages.

Liao et al., "GRID: A Fully Location-Aware Routing Protocol for Mobile Ad Hoc Networks", Telecommunication Systems, 2001, 18, pp. 1-26.

Shih et al., A Distributed Slots Reservation Protocol for QoS Routing on TDMA-based Mobile Ad Hoc Networks, 2004, (ICON 2004), Proceedings, $129^{th}$ IEEE International Conference, Nov. 2004, 2, 660-664.

Shih et al., "CAPC: A Collision Avoidance Power Control MAC Protocol for Wireless Ad Hoc Networks", IEEE Communications Letters, Sep. 2005, 9(9), 859-861.

Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.

Corbett, et al. "A Partitioned Power and Location Aware MAC Protocol for Mobile Ad Hoc Networks," Technical Report No. 553, University of Sydney, School of Information Technologies, Jul. 2004, 7 pages.

Panta, "GeoV2V: Vehicular Communications Using a Scalable Ad Hoc Geocast Protocol," AT&T Labs Research, 14 pages.

Balasubramaniam, et al. "Interactive WiFi Connectivity for Moving Vehicles," Proceedings of SIGCOMM, Aug. 17-22, 2008, 12 pages.

Maihofer, "A Survey of Geocast Routing Protocols," IEEE Communications Surveys, Jun. 2004, 32-42.

Das, et al., "SPAWN: A Swarming Protocol for Vehicular Ad-Hoc Wireless Networks," Proceedings of $1^{st}$ ACM Vanet, Oct. 2004, 2 pages.

German Aerospace Center, Simulation of Urban Mobility, 2010, http://sumo.sourceforge.net, 1 page.

Gupta, et al., "The Capacity of Wireless Networks," IEEE Transactions on Information Theory, 46(2), Mar. 2000, 17 pages.

Hadaller, et al., "Vehicular Opportunistic Communication Under the Microscope," Proceedings of MobiSys, Jun. 11-14, 2007, 206-219.

Heissenbüttel, et al., "BLR: Beacon-Less Routing Algorithm for Mobile Ad-Hoc Networks," Elsevier's Computer Communications Journal, 27, 2003, 15 pages.

Hall, et al., "A Tiered Geocast Protocol for Long Range Mobile Ad Hoc Networking," Proceedings of the 2006 IEEE Military Communications Conf., 2006, 8 pages.

Hull, et al., "CarTel: A Distributed Mobile Sensor Computing System," Proceedings of ACM SenSys, Nov. 2006, 14 pages.

Eriksson, et al., "Cabernet: Vehicular Content Delivery Using WiFi," Proceedings of Mobicom, Sep. 2008, 12 pages.

Karp, et al, "GPSR: Greedy Perimeter Stateless Routing for Wireless Networks," Proceedings of Mobicom, 2000, ACM 2000, 12 pages.

Kuhn, et al., "Geometric Ad-Hoc Routing: Of Theory and Practice," Proc. 2003 Symposium on Principles of Distributed Computing, ACM 2003, 10 pages.

Lee, et al., "CarTorrent: A Bit-Torrent System for Vehicular Ad-Hoc Networks," Mobile Networking for Vehicular Environments, Sep. 2007, 6 pages.

Lee, et al., "Efficient Geographic Routing in Multihop Wireless Networks," Proc. MobiHoc 2005, ACM, 2005, 12 pages.

Ni, et al., "The Broadcast Storm Problem in a Mobile Ad Hoc Network," Proceedings of the $5^{th}$ Annual ACM/IEEE International Conference on Mobile Computing and Networking, ACM, 1999, 151-162.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.

Niculescu, et al., " Trajectory Based Forwarding and Its Applications," Proc. Mobicom 2003, ACM, 2003, 13 pages.

Ns-2, "The Network Simulator," 2010, http://isi.edu/nsnam/ns, 2 pages.

Schwingenschlogl, "Geocast Enhancements of AODV for Vehicular Networks," ACM SIGMOBILE Mobile Computing and Communications Review, Jun. 2002, 18 pages.

Shevade, et al., "Enabling High-Bandwidth Vehicular Content Distribution," Proceedings of CoNEXT 2010, Nov. 30-Dec. 3, 2010, 12 pages.

Yassein, et al., "Performance Analysis of Adjusted Probabilistic Broadcasting in Mobile Ad Hoc Networks," Proc. $11^{th}$ Intl. Conf. on Parallel and Distributed Systems Workshops, 2005, 27 pages.

Zahn, et al., "Feasibility of Content Dissemination Between Devices in Moving Vehicles," Proceedings of CoNEXT 2009, Dec. 1-4, 2009, 11 pages.

Zorzi, et al., "Geographic Random Forwarding (GeRaF) for Ad Hoc and Sensor Networks: Multihop Peformance," IEEE Transactions on Mobile Computing, Dec. 2003, 11 pages.

U.S. Appl. No. 13/327,472, filed Dec. 15, 2011, Hall.

U.S. Appl. No. 13/333,084, filed Dec. 21, 2011, Hall.

Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.

* cited by examiner

LOCATION-BASED MOBILE GAMING APPLICATION AND METHOD FOR IMPLEMENTING THE SAME USING A SCALABLE TIERED GEOCAST PROTOCOL

RELATED APPLICATIONS

The present disclosure is a continuation-in-part of U.S. application Ser. No. 11/893,813, filed Aug. 17, 2007, U.S. application Ser. No. 12/220,598, filed Jul. 25, 2008 now U.S. Pat. No. 7,969,914, U.S. application Ser. No. 12/404,811, filed Mar. 16, 2009, and U.S. Application No. 61/258,167 filed Nov. 4, 2009, which are incorporated in their entirety herein by reference.

TECHNICAL FIELD

The present disclosure relates generally to geolocation-based gaming and, more particularly, to a geolocation-based gaming application using a scalable tiered geocast protocol.

BACKGROUND

Video gaming continues to gain popularity as a pastime. Gaming has become especially accessible with the advent of computer entertainment systems and personal gaming systems, including those using mobile wireless devices. Gaming has also gained in popularity due to advances in technology, such as in display and controller design, and overall game quality.

With the implementation of accelerometers, gaming has become more of a physical activity. A player can control game action by moving a controller to and fro or in a pre-defined gesture motion. In many home gaming systems, controllers are tethered to a game console, limiting players to sitting or standing in place. Even with wireless controllers, players are limited to a small portion of a room by ultra-short-range signals used and/or the need for players to view a television screen.

Gaming applications on wireless terminals, such as smart-phones and handheld gaming devices, allow play anywhere. Using short-range communication, two local players can compete. The game cannot be played if the devices are moved out of range of each other, which could occur due to obstacles or the devices being separated by more than a short distance.

By way of the Internet, players on wireless terminals in remote locations can compete. The recent introduction of geographical positioning systems into wireless terminals has further spawned a number of location-based games. In location-based gaming, also known as geolocation gaming or geo-gaming, players affect play at least in part by changing their geographic location.

SUMMARY

The present disclosure relates to a method for transmitting a virtual game object from a first player to a second player of a real-time geo-game using geocast messaging according to a scalable tiered geocast protocol. The method includes a first processor of a first wireless terminal (WT) receiving a first action input from a first user. The method also includes the first WT, in response to receiving the first action input, generating a first geocast data packet for sending a virtual game object toward a second WT and geocasting the first geocast data packet to the first destination geocast region according to transmission heuristics of the scalable tiered geocast protocol, including determining whether to transmit on one of multiple network tiers. The first geocast data packet includes a first destination geocast region including the second WT, a first location of the first WT, and first movement information indicating first movement characteristics of the virtual game object.

In another aspect, the present disclosure relates to a system for facilitating a real-time geo-game using a tiered geocast protocol. The system includes a first wireless terminal (WT) having a processor and a memory storing instructions. The instructions, when executed by the processor, cause the processor to determine an initial location of the first WT, receive input from a first user for creating a first geographic playing field, and generate a first geocast data packet. The first geocast data packet includes geographic parameters of the first geographic playing field, a first destination geocast region in which a second WT is positioned; and the initial geographic location of the first WT. The instructions, when executed by the processor, cause the processor to also geocast the first geocast data packet to the first destination geocast region according to transmission heuristics of the tiered geocast protocol, including determining on which of multiple network tiers to transmit the first geocast data packet.

In yet another aspect, the present disclosure relates to a method for initiating real-time geo-game using a scalable tiered geocast protocol. The method includes a first wireless terminal (WT), programmed with the scalable tiered geocast protocol, geocasting a game declaration to a destination geocast region containing potential participants, wherein the game declaration includes the destination geocast region and an initial geocast region in which the first WT is positioned. The method also includes a second WT, of one of the potential participants and programmed with the scalable tiered geocast protocol, receiving the game declaration in the destination geocast region and responding by geocasting a response message indicating interest in participating in the real-time geo-game, wherein the response message includes the destination geocast region and the initial geocast region.

In still another aspect, the present disclosure relates to a method for transmitting scoring information for a real-time geo-game using a scalable tiered geocast protocol. The method includes a first wireless terminal (WT), participating in the geo-game and programmed with the scalable tiered geocast protocol, generating and geocasting a scoring message to a destination geocast region containing a second WT containing potential participants, wherein the scoring message includes the destination geocast region, an initial geocast region in which the first WT is positioned, and the scoring information. The method also includes a second WT, participating in the geo-game and programmed with the scalable tiered geocast protocol, receiving the scoring message in the destination geocast region and recording the scoring information communicated in the scoring message.

Other aspects of the present invention will be in part apparent and in part pointed out hereinafter.

DETAILED DESCRIPTION

Figure 1:
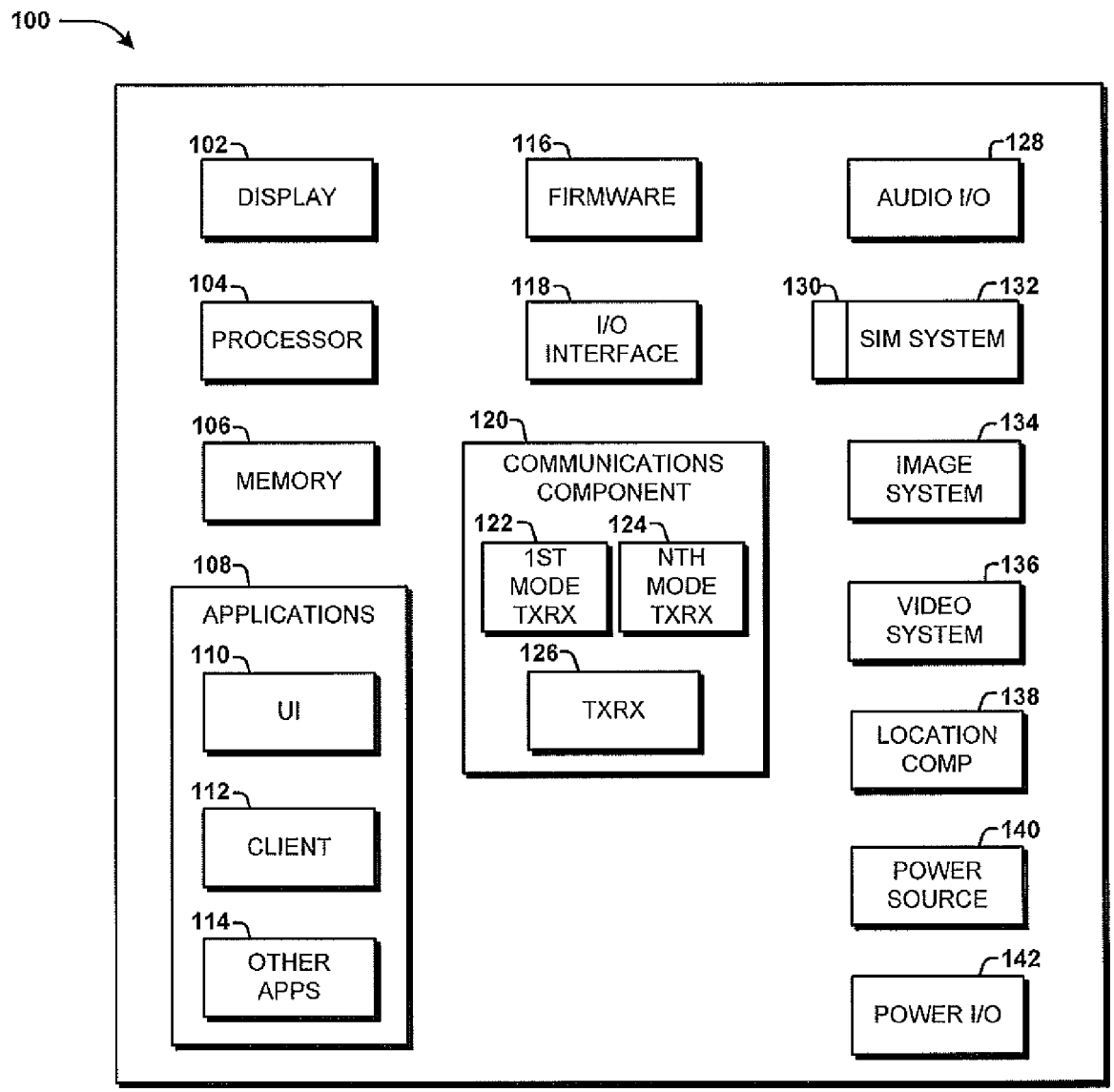
FIG. 1 illustrates an exemplary wireless terminal and components thereof, according to an embodiment of the present disclosure.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure in various ways.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Overview of the Disclosure

In various embodiments, the present disclosure describes systems and methods for initiating and facilitating a geo-gaming experience using a scalable tiered geocast communication protocol. Wireless terminals (WT) taking part in the game are programmed with a geo-gaming application, which uses geo-location information obtained from a locating system, such as a global positioning system (GPS).

The geo-gaming application of each WT in the game controls a position of a simulated or virtual player based on location data received from the location system. In some embodiments, the geo-gaming application in the WI uses movement data from an inertial unit of the WT to control a posture and/or movement of a virtual player.

The scalable tiered geocast communication protocol is programmed into each WT taking part in the game, and any WT that operates to relay communications to or from the WTs taking part in the game. The WTs taking part in the game share changed game conditions, such as WT geo-location, between them by geocast data packets transmitted over one or both of a first tier, short-range, network, and a second tier, long-range, network according to transmission heuristics of the tiered geocast protocol.

The presently disclosed geo-gaming architecture may be used to facilitate a wide variety of games. In one example, the game involves players virtually hitting, or virtually catching and throwing, back and forth a game object, such as a virtual ball or flying disc (e.g., Frisbee® (Frisbee is a registered trademark of Wham-O Manufacturing Corporation, of San Gabriel, Calif.)). Movements of the virtual game object are also shared between WTs in geocast data packets transmitted according to the tiered geocast protocol. In some embodiments, other game information, such as location and size of predefined playing areas, and scoring during the game, are propagated in geocast data packets according to the tiered geocast protocol. Before describing details of exemplary geo-games for implementation using the present tiered geocast protocol, an exemplary WT and the scalable tiered geocast protocol are described in connection with FIG. 1 and FIG. 2, respectively.

Geo-Gaming Device

Turning now to the figures, and more particularly to the first figure, FIG. 1 illustrates a schematic block diagram of an exemplary wireless terminal (WT) 100 for use in accordance with embodiments of the present disclosure. The WT 100 may be, for example, a smartphone or dedicated mobile gaming device.

Although connections are not shown between all of the components illustrated in FIG. 1, the components can interact with each other to carry out device functions. In some embodiments, for example, the components are arranged so as to communicate via one or more busses (not shown). It should be understood that FIG. 1 and the following description are intended to provide a general understanding of a suitable environment in which the various aspects of some embodiments of the present disclosure can be implemented.

In some embodiments, the WT 100 is a multimode headset and has a variety of computer readable media, including, for example, volatile media, non-volatile media, removable media, and non-removable media. The term "computer-readable media" and variants thereof, as used in the specification and claims, refers to storage media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other tangible medium that can be used to store the desired information and that can be accessed by the WT 100.

The WT 100 includes a display 102 for displaying multimedia such as, for example, virtual objects, virtual object trajectories, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like. The illustrated WT 100 also includes a processor 104 for controlling, processing data, and/or executing computer-executable instructions of one or more applications including the geo-gaming application using the scalable tiered geocast communication protocol.

The WT 100 also includes a memory 106 for storing data and/or one or more applications 108, such as the geo-gaming application. In some embodiments, the memory 106 stores information associated with determining location of the WT 100 according the methods described herein.

In some embodiments, the application(s) 108 include a user interface (UI) application 110. The UI application 110 interfaces with a client or operating system (OS) 112 to, for example, facilitate user interaction with device functionality and data. In some embodiments, the OS 112 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems are contemplated.

The UI application 110 aids the user in entering message content, viewing received messages, answering/initiating calls, entering/deleting data, entering and setting user IDs and passwords, configuring settings, manipulating address book content and/or settings, interacting with other applications 114, and the like, and may aid the user in inputting selections and maneuvers associated with geo-games according to the present disclosure.

In some embodiments, the other applications 114 include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like. The applications 108 are stored in the memory 106 and/or in a firmware 116, and can be executed by the processor 104. The firmware 116 can also store code for execution during device 100 power up, for example.

The illustrated WT 100 also includes one or more input/output (I/O) interfaces 118 for input/output of data, such as, for example, user IDs, passwords, and application initiation (start-up) requests. In some embodiments, the I/O interface 118 is a hardwire connection, such as, for example, a USB, mini-USB, audio jack, PS2, IEEE 1394, serial, parallel, Ethernet (RJ48) port, RJ11 port, or the like. In some embodiments, the I/O interface 118 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 118 can be used for communications between the WT 100 and one or more network or local devices, instead of, or in addition to, a communications component 120.

The communications component 120 interfaces with the processor 104 to facilitate wired and/or wireless communications with external systems. Example external systems include, but are not limited to, peer-to-peer networks, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks.

In some embodiments, the external systems are implemented using WIFI, WIMAX, combinations and/or improvements thereof, and the like. In some embodiments, the communications component 120 includes a multimode communications subsystem for providing cellular communications via different cellular technologies. In some embodiments, for example, a first cellular transceiver 122 operates in one mode, such as, Global System for Mobile communications (GSM), and an Nth cellular transceiver 124 operates in a different mode, such as Universal Mobile Telecommunications System (UMTS), While only two cellular transceivers 122, 124 are illustrated, the WT 100 may include more than two transceivers.

The illustrated communications component 120 also includes a transceiver 126 for use by other communications technologies such as, for example, WIFI, WIMAX, BLUETOOTH, infrared, infrared data association (IRDA), near field communications (NFC), RF, and the like. In some embodiments, the communications component 120 also facilitate reception from terrestrial radio networks, digital satellite radio networks, Internet-based radio services networks, combinations thereof, and the like. The communications component 120 can process data from a network such as, for example, the Internet, an intranet, a home broadband network, a WIFI hotspot, and the like, via an ISP, DSL provider, or broadband provider.

In some embodiments of the present invention, audio capabilities for the WT 100 are provided by an audio I/O component 128 including a speaker to output audio signals and a microphone to receive audio signals.

The illustrated WT 100 also includes a slot interface 130 for accommodating a subscriber identity system 132 such as, for example, a subscriber identity module (SIM) card, a universal SIM (USIM) card, or a universal integrated circuit card (UICC). Alternatively, the subscriber identity system 132 can be manufactured into the device 100, thereby obviating the need for a slot interface 130. In some embodiments, the subscriber identity system 132 stores information associated with determining location of the WT 100 according the methods described herein. For example, the subscriber identity system 132 may store information including user preference factors and/or administrative factors set by an administrator, manufacturer, or service provider, which are described in more detail below. In some embodiments, the subscriber identity system 132 is programmed by a manufacturer, a retailer, a user, a computer, a network operator, or the like.

The illustrated WT 100 also includes an image capture and processing system 134 (image system). Photos can be obtained via an associated image capture subsystem of the image system 134, for example, a camera. The illustrated WT 100 also includes a video system 136 for capturing, processing, recording, modifying, and/or transmitting video content.

The illustrated WT 100 also includes a location component 138 for use in determining geographic location of the WT 100. The location component 138 may include, for example, a GPS receiver. The location of each terminal 100 affects the heuristic determinations that the terminal 100 makes in accord with the protocol described further below.

The illustrated WT 100 also includes a power source 140, such as batteries and/or other power subsystem (AC or DC). The power source 140 can interface with an external power system or charging equipment via a power I/O component 142.

Scalable Tiered Geocast Communication Protocol

Each WT taking part in the game is programmed with the scalable tiered geocast communication protocol. One example of a type of scalable protocol is the mobile ad hoc network (MANET) geocast protocol, which is described in part below, and in further detail in related U.S. patent application Ser. No. 12/404,811. Using the tiered geo-cast protocol, geo-gaming according to the present disclosure can be occasioned in all types of network scenarios, including those in which relevant areas are densely populated with participating WTs, those in which areas are sparsely populated, and even in areas long-range infrastructure such as cell towers, WIFI hotspot or other Internet router are not reachable by the WTs taking part in the game.

Geocast protocols differ from a traditional Internet protocol (IP) such as the uniform datagram protocol (UDP) in that messages are addressed to a destination geocast region instead of an IP address, such as an UDP address. With the protocol of the present disclosure, WTs in a target area do not need to register to a group address, as required of some other protocols. In some embodiments, each geocast data packet is at origination assigned a globally-unique packet serial number. The unique packet serial number is read by participating devices according to the protocol to, for example, determine whether a particular data packet is being received for a first time or has been received before. The packet serial number and all other packet information may be positioned in a header or body of the data packet.

Geocast origination, destination, and termination regions are defined by geographic parameters and may have any size and shape. As examples, the regions may be defined by three or more bounding geographic coordinates, forming a triangle, rectangle, or other shape, or a single geographic coordinate and a radius or diameter, forming a circular geocast region.

Players identify the geocast destination and/or termination regions directly or indirectly. In one embodiment, an initiating player selects a destination and/or termination region indirectly by identifying a target player with whom the initiating player wishes to play. The geocast destination and/or termination regions may be defined by the initiating WT, the target WT, or other entity, such as a remote server facilitating game initiation and/or play. The geocast destination and/or termination regions may be defined, at least in part, based on a location of the target WT. In various embodiments, the location of the target WT is obtained from the target WT or other sources such as from a network resource, like a home location register (HLR) to which the target WT is associated.

In some embodiments, the initiating player selects a geocast destination or termination region by making one or more selections on a map. For example, if a player on a college campus in New York wishes initiate play with one or more players located on a college campus in London, the initiating player may select the campus in London, or a desired portion of the campus, such as a particular fraternity house selected by map input, as the geocast destination or termination region. The selection may be made by the player selecting a location on the map by finger(s), and dragging away or gesture-pinching, from the selected location to create the size of the a circle, oval, rectangular or other shape constituting the geocast destination or termination region. Locations, such as addresses, and/or region dimensions may also be input in other ways by a player, such as by typing, gesture, and/or voice input.

The geo-gaming application is in some embodiments configured to store pre-set or previously identified geocast destination or termination regions, and allow the initiating player to select the region for geocasting.

Geocast data packets are transmitted according to heuristics of the tiered geocast protocol, which is described in more detail below, to a destination geocast region for reception by all devices located in the region that are programmed with the geocast protocol—i.e., participating devices.

Although basic geocasting over only a single network (e.g., long-range network) enables communications in some situations where traditional networking is impractical or inadequate, it is in some embodiments preferable to selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating WT and other nodes (e.g., WIFI access point or other router) have forwarding rules, including geographical parameters, and a look-up table for use in implementing the rules.

In one embodiment, the geocast system is configured so that a transmitting WT receives a confirmation that a geocast data packet was transmitted successfully. For example, it is contemplated that at least one of the WTs in a geocasting destination region, even if not a WT actively participating in the game, could return geocast a confirmation data packet indicating that the packet was received by a WT in the region. In one contemplated embodiment, although the protocol is based on a geographical address and not a device-specific address, a device-specific address of a target WT participating in the game is included in a geocast and the target WT initiates inclusion in a return geocast data packet of a confirmation of receipt message to the originating WT.

In addition, in some embodiments, a geocast data packet includes one or more fields, such as in a header or body of the packet, in which information related to a path taken by a packet is recorded. For example, a receiving node (e.g., WT or Internet router) receiving a geocast can retrieve data from the geocast header to identify an ordered list of the nodes whose transmissions led to the receiving node receiving it. In this way, path discovery is integrated into the transmission process. Any node can also use this information to send a source-routed unicast back to any node along the path, which is termed reverse-path forwarding (RPF).

Although a two-tiered communication system, including a first short-range peer-to-peer network and a long-range network, is primarily described herein, the geo-gaming application of the present disclosure may be implemented in connection with a protocol and communication system using other types of networks as well as or instead of those described herein, and in connection with more than two network tiers.

Propagations over the short-range network are made between devices programmed with the scalable tiered geocast protocol, whereby adjacent devices are within range of each other, such as radio range (e.g., 100 meters). The WTs and tiered geocast protocol are configured to transmit geocast data packets over one or more short-range networks, including existing wireless local area networks (WLANs), such an IEEE 802.11 network. As an example, when a first gaming WT is about 900 meters from an edge of a geocasting region including a second gaming WT, a geocast data packet from the first device would be broadcasted and participating intermediate devices would receive and retransmit the geocast data packet until it reached the geocast region, without need for transmission over an Internet router or other base station. In this example, depending on the location of a retransmitting device, the geocast data packet can be broadcast to the geocast region in one or two hops.

Figure 2:
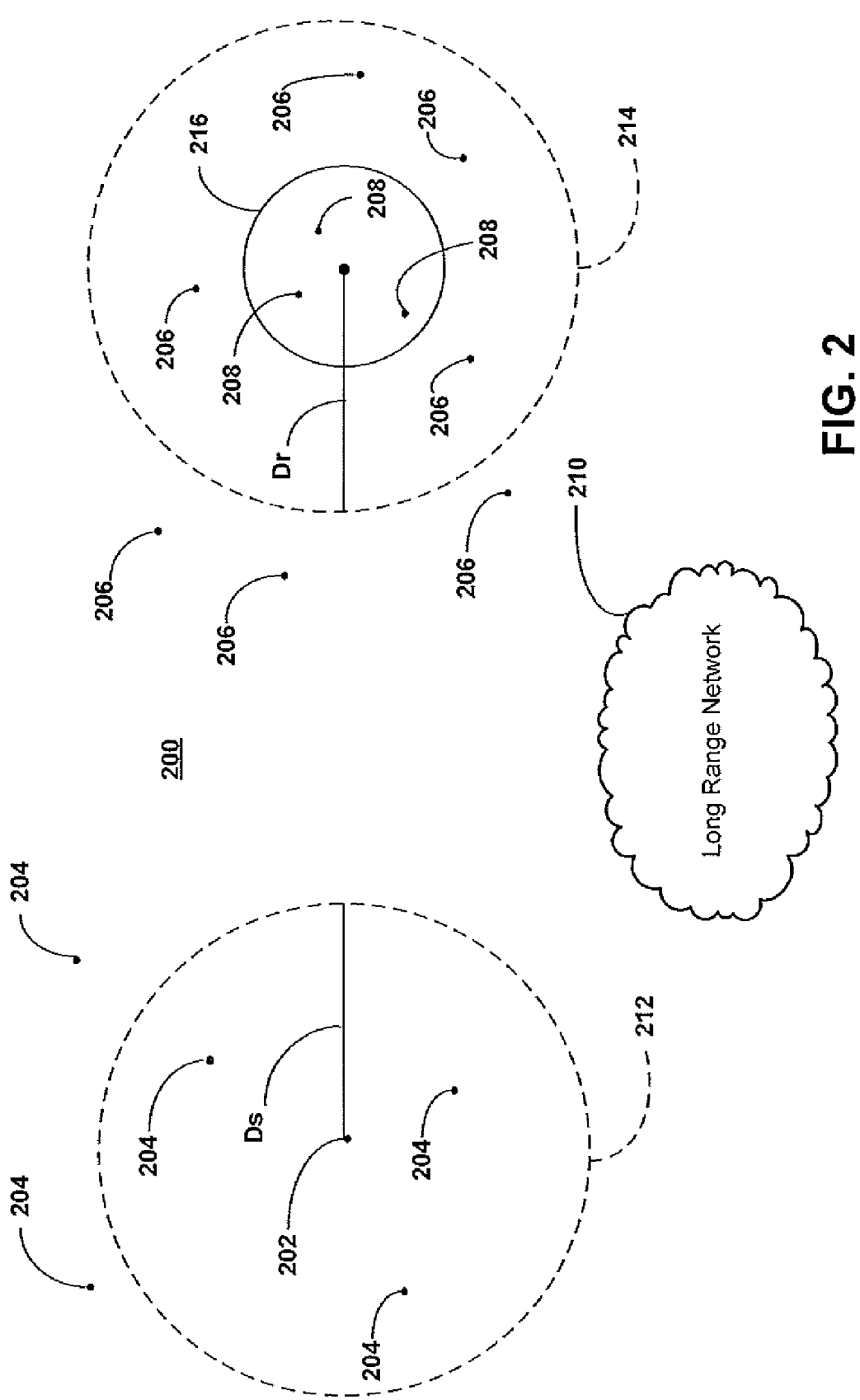
FIG. 2 illustrates an exemplary tiered geocast protocol communications system, according to an embodiment of the present disclosure.

FIG. 2 shows a scalable tiered geocast communication system 200, such as the MANET, in accordance with an embodiment of the present disclosure. While details of the MANET are discussed herein, it should be appreciated that the embodiments of the present disclosure may be implemented with any communication system using a scalable tiered geocast protocol, without departing from the scope of the present disclosure.

The system 200 includes a plurality of WTs 202, 204, 206, 208, each programmed with the scalable tiered geocast protocol. Each WT 202, 204, 206, 208 is operable to determine its geographical location through any type of location determination system including, for example, a GPS receiver. The WTs 202, 204, 206, 208, in some embodiments, using other positioning systems, in addition to or in lieu of GPS, such as dead reckoning, triangulation, beacons, video, infrared, or other sensor systems, and/or an inertial unit, such as a three-axis accelerometer. Beacons, dead reckoning, sensor systems, and inertial units can be helpful as a supplement to GPS, especially when the terminals are indoors or may otherwise be continuously or intermittently out of range of range of satellites or towers, and can e used periodically or intermittently to reduce power usage.

Each WT 202, 204, 206, 208 is operable to transmit and receive packets over the tiered geocast communication system 200. At any given time, some subset, and possibly all, of the WTs may be operable to transmit and receive packets over a long-range network 210. The long-range network 210 may be any network in which packets can be transmitted from one long-range capable WT to another long-range capable WT.

In the embodiment shown in FIG. 2, the communication system 200 has an origination region 212 covering a circular geographical area with a distance Ds around an originating WT 202 as a defining point, such as a center point. The communication system 200 also has a termination region 214 covering a shaped geographical area, such as a circle, with a distance Dr including a geocast region 216. In some embodiments, the termination region 214 and destination region 216 share a defining point, such as a central point (e.g., thus being concentric).

The origination and termination regions 212, 214 can be defined in terms of other geometric shapes such as rectangles, hexagons, irregular shapes, curvilinear shapes, or in any desired mixture of such shapes. The information defining these regions, e.g., the location, size, and shape, are in some embodiments carried in the packets themselves. The information may therefore vary from packet to packet or be fixed in advance of communications.

In the communication system 200, the originating WT 202 and some of its neighboring WTs 204 are located within the origination region 212. Some of the WTs 206 and all of the WTs 208 (which are located in the geocast region) are located within the termination region 214.

In communication system 200, when the originating WT 202 wants to geocast a packet to the WTs 208 located in geocast region 216, it will address the packet with its own location coordinates as the sending location and the location coordinates of the geocast region. If the originating WT 202 is not long-range capable at the time of transmission, it will initiate a location-based flooding of the packet to all neighboring WTs 204 on the MANET.

Such a location-based flooding process may prevent receiving WTs from retransmitting a geocast data packet that was most likely already retransmitted by another WT located close to it and, thus, most likely reaching the same neighboring terminals that it can reach. In addition, such a location-based flooding process reduces the chance that the WT will retransmit the same packet multiple times to the same neighboring WTs. As a result, the location-based flooding process in accordance with the present disclosure reduces the number of wasted or redundant retransmissions on the MANET. As a complement, a minimum-number-of-transmissions check adds some redundancy to compensate for the fact that any one transmission can fail to reach certain receivers.

An intermediate WT 204 that is long-range capable at the time of receiving the packet, whether in the origination region 212, will retransmit the packet on the long-range network 210 to all long-range capable terminals 206, 208 lying within the termination region. The long-range transfer can be achieved by long range geocast or by other means known in the art. It can be appreciated that other techniques may be used, such as broadcast, a series of unicasts, geocasts, or other techniques for notifying a set of recipients of a single transmission.

Each long-range capable WT 206, 208 will receive the packet and compare its own location to the location of the geocast region 216. If the location of the receiving WT 206, 208 is within the termination region 214, it may choose to transmit the packet on the MANET, initiating or continuing the simple location-based flooding of the termination region. The decision of whether to transmit as part of the location-based flooding may be made based upon a location-based flooding decision algorithm in accordance with the present invention such as the one described below and shown in FIG. 3. If a WT 206 that is not located within the termination region (and not within the origination region) receives the packet, it will not retransmit the packet on the MANET.

If, on the other hand, the originating WT 202 is itself long-range capable at the time it wishes to send and not already lying in the termination region, as shown in FIG. 2, for example, it will transmit the packet on the long-range network 210 to all long-range capable terminals 206, 208 lying within the termination region. In this case, the originating terminal 202 does not also transmit the packet on the MANET, as this would be unnecessary in the origination region, the goal of getting the packet onto the long-range network 210 having already been achieved.

Packets transmitted over the long-range network 210 from the WTs 204 will be received over the long-range network 210 by WTs 206, 208. The WTs 206 that are located more than a set distance from a defining point of a destination region 216, such as a center of the region 216, and thus outside the termination region 214, will not retransmit the packet on the MANET. The WTs 206 that are located within the termination region 214 and the WTs located within the geocast region 216 will participate in location-based flooding of the termination region and hence may decide to retransmit the packet on the MANET.

In communication system 200, it should therefore be understood that the retransmission of packets is limited depending on the long-range capability of the WT, and the proximity of the WT to the origination WT 202 and the geocast region 216. The size and shape of the origination region 212 and the termination region 214 can be any size and shape determined by those skilled in the art.

By increasing the distance Dr or the size of the termination region 214, the number of rebroadcasts on the MANET will thereby tend to increase. By decreasing the size of the termination region 214 or the distance Dr, the amount of rebroadcasts on the MANET may decrease. Similarly, by increasing the size of the origination region 212 or the distance Ds, the number of rebroadcasts on the long-range network 210 will tend to increase. By decreasing the size of the origination region 212 or the distance Ds, the amount of rebroadcasts on the long-range network 210 may decrease. However, it is also clear that decreasing either the origination region 212 or the termination region 214, or both, may result in the packet failing to reach the geocast region, as it may occur that no WT within the smaller origination or termination regions 212, 214 is long-range capable at the time the packet is to be transmitted. As a result, the appropriate choice of Ds and Dr, or the size of the origination region 212 and termination region 214, can be made when judging the typical geographic distributions of nodes and the required reliability of communications as determined by each particular application of the present invention.

Figure 3:
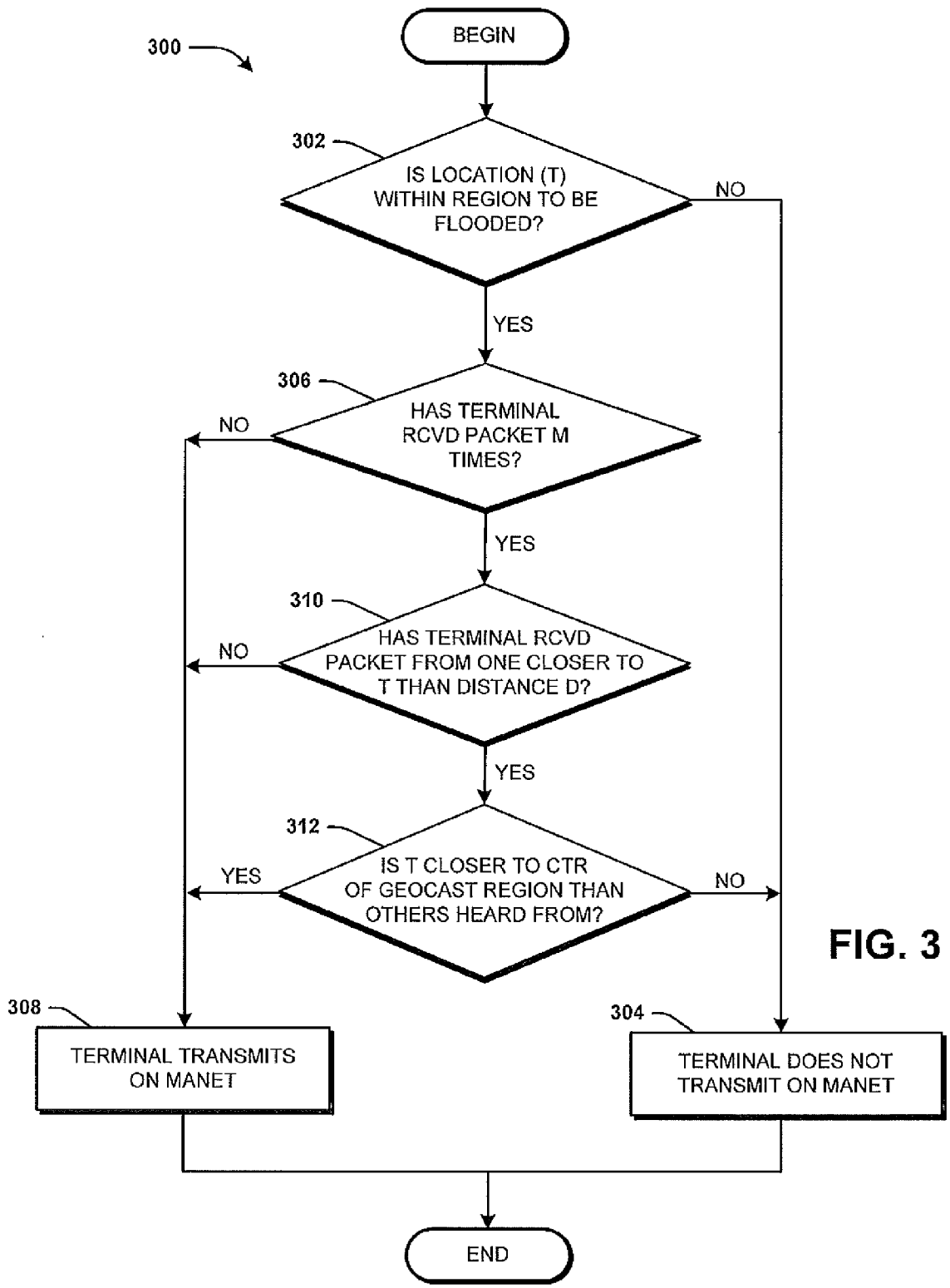
FIG. 3 illustrates an exemplary method for location-based flooding in accordance with the scalable tiered geocast protocol of an embodiment of the present disclosure.

FIG. 3 shows a method 300 for location-based flooding in accordance with the scalable tiered geocast protocol. It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer-readable medium, such as the memory 106 of the WT 100 and/or a memory module of a location server or mobile locating platform (not shown), for example.

As shown, method 300 begins and proceeds to step 302 where a WT, upon receiving a geocast packet, determines whether its location T is within a termination region covering a geographical area including the geocast region. If the WT is not located within the termination region, flow proceeds to step 304 wherein it will not retransmit the received geocast packet on the MANET. If the location T of the WT is within the termination region then, at step 306, it will determine whether it received the same geocast packet at least some minimum number of times M. If the geocast packet was not already received at least some minimum number of times M then, at step 308, the WT will retransmit the packet on the MANET.

Retransmission is based on heuristics in the protocol and the situation, otherwise known as a configuration state based on the packet(s) being received and location of the retransmitting WT. If the packet already was received some minimum number of times M then, at step 310, the WT will determine whether it has received the geocast packet from a sending WT that is closer to the WT than some minimum distance D. The WT may make this determination by comparing its present geographical location T to the location of the sending WT, which originally transmitted the geocast packet. The location of the sending WT may be determined using location information in the geocast packet.

In some embodiments, geolocation information of the sender of a geocast packet is included in the packets. Such location information is typically in the form of geographical coordinates. The geographical coordinates of the sending WT may be compared by an intermediate WT to its own geographical coordinates T to make the determination of step 310.

If the sending WT is determined to not be located within the minimum distance D, then, at step 308, WT will transmit the packet on the MANET. If the sending WT is determined to be located within the minimum distance D, then, at step 312, WT will determine whether its location T is closer to the defining point, e.g., center, of the geocast region than any sending terminal from which the same packet was received by the WT. The WT may make this determination by comparing its geographical location T to the location coordinates of the sending terminal found in each of the packets it received, as described above. The determination may also be based, in whole or in part, upon the geocast region also contained in the geocast packet. For example, the WT may compare its location T to the location of the geocast region contained in the geocast packet.

If the WT is determined to be closer to the center of the geocast region than any other sending terminal from which it received the same packet then, at step 308, the WT will transmit the packet on the MANET. If any of the sending WTs are closer than the location T of the WT then, at step 304, the WT will not transmit the packet on the MANET.

By limiting retransmissions on the MANET to WTs that pass the heuristic criteria in FIG. 3, the method 300 reduces the number of repeated retransmissions of the same packet on the MANET over prior art systems. In addition, by limiting retransmissions of a given packet on the MANET to WTs that are closest to the center of the geocast region (step 312), the method 300 further reduces the number of retransmissions of the same packet on the MANET over the prior art. With traditional peer-to-peer protocols, the number of WTs taking part in retransmitting increases rapidly and sometimes somewhat uncontrollably as packets are automatically retransmitted, and sometimes multiple times by the same terminals.

For example, with some protocols, the number of message copies being transmitted can double one or more times in a short span, resulting in quadratic or exponential increases. The protocol of the present disclosure, though, dynamically adjusts to the number of participating devices, thereby generally keeping an increase in WT participation and packet copies almost flat. Tying up less WTs adds efficiency and limits use of overall network resources.

Figure 4:
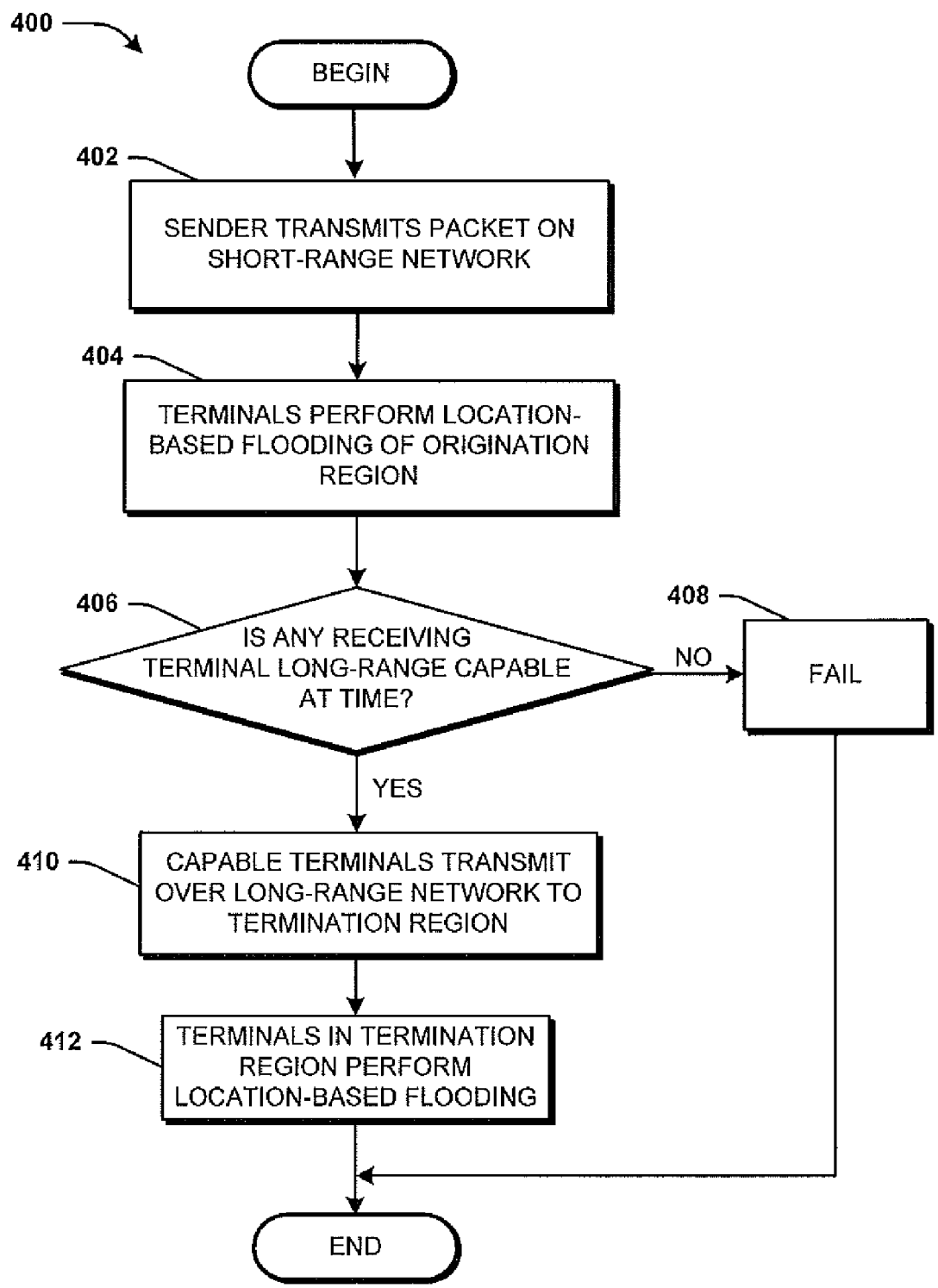
FIG. 4 illustrates an exemplary method by which a wireless terminal determines whether to retransmit a geocast packet over a long-range network, in accordance with the scalable tiered geocast protocol of an embodiment of the present disclosure.

FIG. 4 shows a method 400 by which a WT determines whether to retransmit a geocast packet over the long-range network. As with all methods disclosed herein, it should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. In certain embodiments, some or all steps of this process, and/or substantially equivalent steps are performed by execution of computer-readable instructions stored or included on a computer-readable medium, such as the memory 106 of the WT 100 and/or a memory module of a location server or mobile locating platform, for example.

As shown, method 400 begins and flow proceeds to step 402 wherein the originating WT transmits the packet on the MANET. The packet will contain information including the location of the originating terminal and a definition of the geocast region. Information in the definition of the geocast region includes information that enables WTs to determine location information of the geocast region including, for example, location coordinates that define the location, size, and shape of the geocast region.

Also at step 402, the WTs that receive the transmission over the MANET from the originating WT will determine location information of an origination region and a termination region. The determination of the origination region and the termination region may be made in any way desired by those skilled in the art. For example, the origination region may be fixed a priori by common agreement (e.g., all terminals will use a circular area having a radius X around the originating terminal and a radius Y around the center of the geocast region). Or, as another example, the origination region and the termination region may be specified by the origination terminal in the packet as part of the addressing information.

In one embodiment, the method 400 includes a step (not shown) wherein the originating WT that originally intends to transmit a geocast packet to a geocast region determines prior to step 402, whether it is capable of transmitting the packet over a long-range network. If not, then flow proceeds to step 402, and if so, flow proceeds to step 410.

At step 404, the WTs that received that geocast packet from the originating WT on the MANET will then perform location-based flooding of the MANET. In conducting the location-based flooding, at step 406, each WT will determine whether it is long-range capable (i.e., whether it is operable to transmit the packet on the long-range network) at the time it retransmits the packet. If no terminals are long-range capable, then the geocast will fail at step 408, assuming terminating region does not overlap origination region. For any terminal that is long-range capable, it will multicast the packet over the long-range network to WTs located in the termination region at step 410. Then, at step 412, the WTs in the termination region will perform location-based flooding of the termination region.

The decision of whether and how to retransmit received geocast data packets (e.g., on a first, short-range tier and/or on a second, long-range tier) according to one embodiment is summarized in a three-step process, as follows. First, the receiving WT determines whether it has previously received the same packet at least M times. If not, it retransmits the packet on the short-range network, such as the MANET. If it has received the packet at least M times, it moves to a second step and determines whether the sending terminal is closer than some minimum distance away. If no prior transmitter of the packet was closer than some minimum distance away, the WT retransmits the packet on the MANET. Otherwise, it moves to a third step of determining whether it is closer to a center of a geocast region than any sending terminal from which the packet was received. If it is, it transmits the packet on the MANET. If not, it will not retransmit the packet.

By offloading retransmissions of geocast packets from the MANET to the long-range network, method 400 reduces the amount of MANET processing power utilized for each geocast. For example, method 400 makes it possible that for each geocast not every reachable WT in the MANET will have to rebroadcast. Instead, only a subset of the WTs located within the origination region and a subset of the WTs located within the termination region will retransmit the packet, thereby reducing the amount of processing power and wireless bandwidth used for each geocast. In addition, by using the long-range network, many-hop paths on the MANET can be replaced by fewer-hop paths taken via long-range network transmissions, thereby reducing packet latency for paths covering long geographic distances. The tiered geocast protocol is considered scalable for these additional reasons.

Gaming Applications

The gaming architecture of the present disclosure may be implemented with geo-games of various formats. Herein are primarily provided relatively-simple geo-game formats for ease of description. One format of geo-game involves players virtual hitting, or throwing and catching, of a virtual game object back and forth. Simple and more sophisticated geo-games alike may be used with the current architecture for geo-gaming in ways and circumstances that would be impractical to mimic using standard distributed gaming techniques.

Players defend their territory from a simulated or virtual object (e.g., ball) landing in their territory by running to a point in the real world corresponding to a virtual impact point of the virtual ball. Then, as described in more detail below, the player may use their WT to indicate a "hit" or "catch" action prior to a landing time of the virtual object. If successful, the player may then "hit" or "throw" the simulated ball toward another player's territory to attempt to score on them. This is reminiscent of the traditional game of volleyball, but done using a simulated ball, and with the potential generalization of the rules to allow any number of players, balls, and playing field size and geometries. In particular, for example, a player in New York could play against players in San Francisco, Tokyo, London, or elsewhere, all at the same time.

In the game, each participating WT has a processor configured to process a tiered geocast communications application having the geocast protocol in a memory of the WT. The processor is also configured to process the geo-gaming application, also stored in the memory of the WT.

Game Session Initiation

Figure 5:
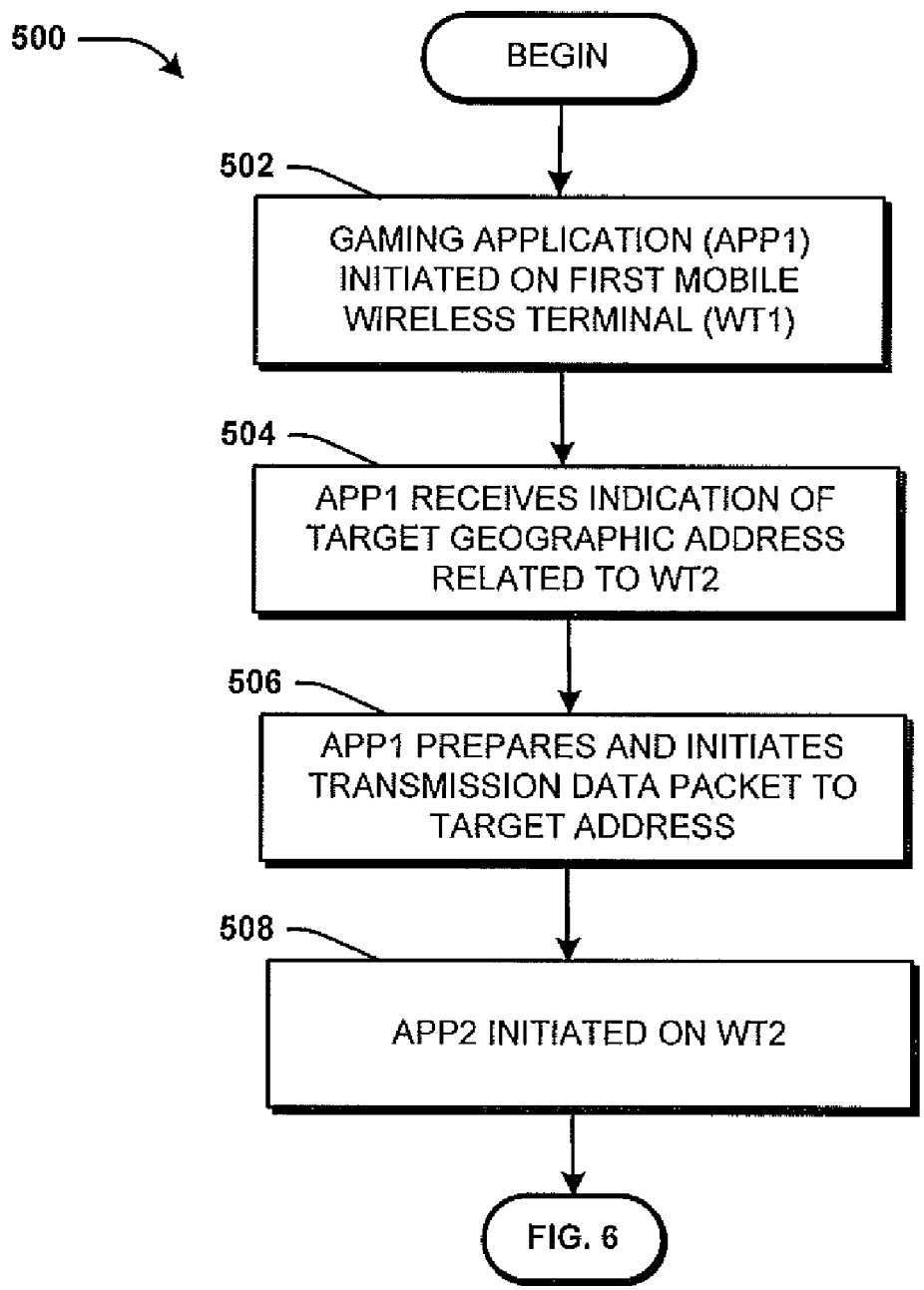
FIG. 5 illustrates an exemplary method for initiating a geo-game, according to an embodiment of the disclosure.

FIG. 5 shows a method 500 for initiating and a game session using the scalable tiered geocast protocol, and FIGS. 6, 7, 8, and 9 show exemplary methods for implementing other aspects of the game session. The methods 500, 600, 700, 800, and 900 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods 500, 600, 700, 800, and 900 can be ended at any time—e.g., some or all described steps can be performed alone and some or all of the steps can be performed together. In certain embodiments, some or all steps of this process, and/or substantially equivalent steps are performed by execution of computer-readable instructions stored or included on a computer-readable medium, such as the memory 106 of the WT 100 and/or a memory module of a location server or mobile locating platform (not shown), for example.

The method 500 of FIG. 5 begins and proceeds to step 502 where a game session is initiated by the gaming application on an initiating, or first WT. In some embodiments the gaming application is initiated in response to receiving input from a player using the first WT requesting initiation of the game. It is contemplated that some communications associated with the geo-game, such as the initial contact, and other steps involved with establishing the game between players, may be facilitated using the geocast protocol or a protocol based on traditional device-specific addresses (e.g., IP addresses). At step 504, the processor of the first WT, operating the gaming application, receives indication of a target address, such as an address of a target geocasting region, corresponding to one or more other players. At step 506, the processor prepares and initiates transmission of an originating or initiating data packet having the target address.

In some embodiments, the initiating data packet includes at least one initial location indication having either an initial geographic location of the first WT or an initial geocasting region including the initial geographic location. The initiating geocast data packet also includes the address (e.g., IP address) of the target, second device, which is also programmed with the tiered geocast communications application and the gaming application. At step 508, the processor of the second WT initiates the gaming application on the second WT in response to input by the second player or in response to receiving the initiating geocast data packet from the first WT.

Field Declaration

Figure 6:
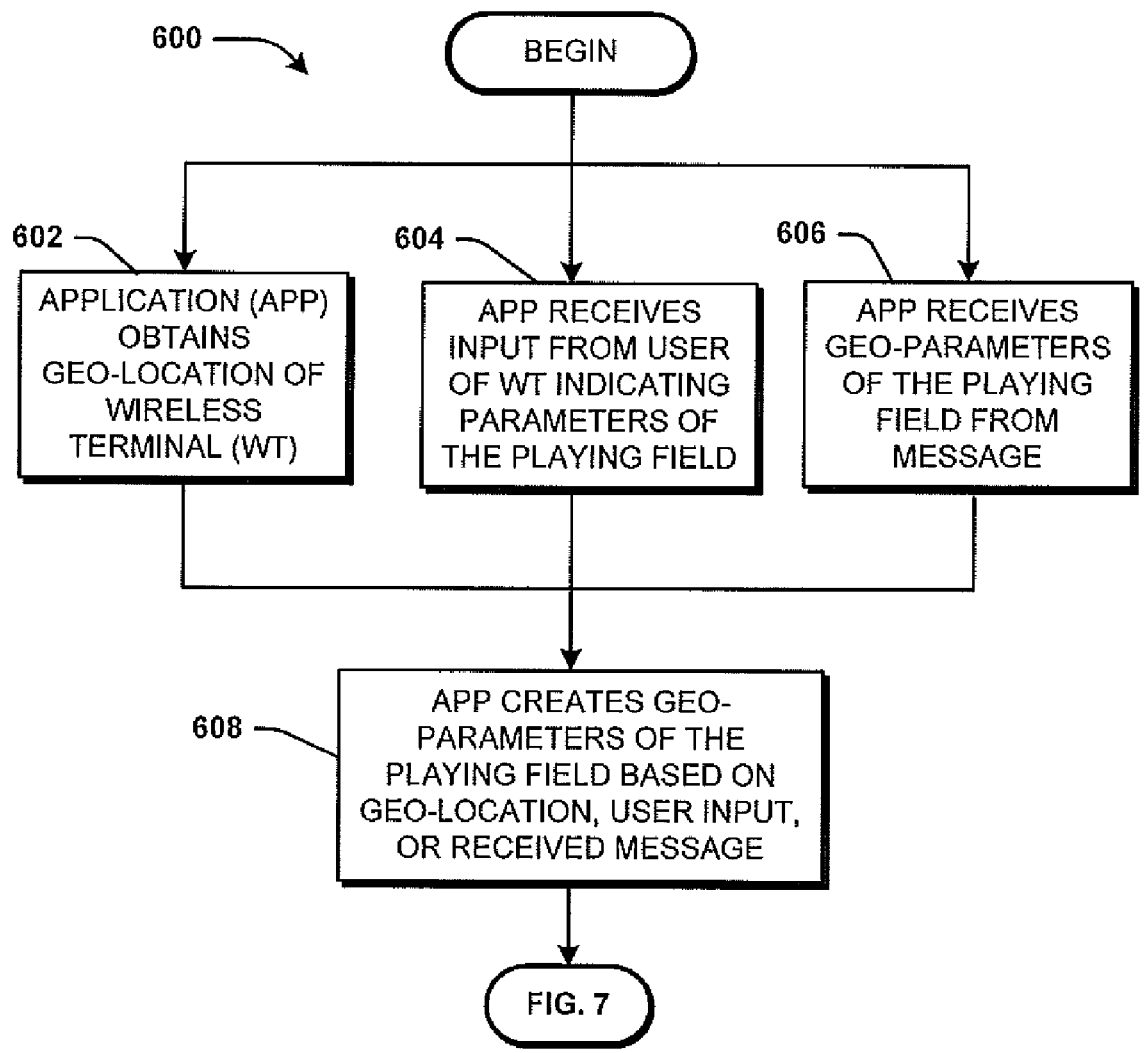
FIG. 6 illustrates an exemplary method for establishing a field of play, according to an embodiment of the present disclosure.

For some gee-games, a virtual zone or field of play for each player or team may need to be defined. The processor of each WT is configured to, in operating the geo-gaming application, set game field parameters. FIG. 6 shows a method 600 for establishing a virtual playing field in various exemplary ways. The method 600 begins and proceeds to a first initial step 602, a second initial step 604, or a third initial step 606 for creating the virtual field corresponding to one of the playing WTs.

At step 602, the gaming application of the WT, in operating the gaming application, initiates automatic formation of the virtual playing field and obtains a geo-location of the WT. At step 604, the processor of each WT, in operating the gaming application, receives input from the respective players indicating geographic parameters of the first geographic playing field. In one particular embodiment, the input includes the player moving the WT for creating the geographic parameters of their geographic playing field. One way of moving the WT to create the field is by walking the perimeter of the field. A benefit of allowing the player to walk off the field is that the player can better ensure that their field is free of impediments, such as trees and other structures. The processor and player may not realize that a structure that may seem to the player far enough away to be outside of the field is actually on the field. The player may be hindered from reaching the game object near the structure, and the field would need to be reformed.

In another particular embodiment, the input of step 604 includes geographic coordinates input manually by the player. For example, the WT may present to the player a close-up map of the player's vicinity, and allow them to select bounds of the field, such corners and/or boundary lines, by touching the screen. At step 606, the application receives a message indicating the geo-parameters of the field of play. The message may be part of a geocast data packet transmitted according to the geocast protocol described herein.

For embodiments in which the processor of the WT, in operating the gaming application, initiates automatic formation of the virtual playing field and obtains a geo-location of the WT in step 602, at step 608, the application creates the virtual playing field having geographic parameters related to the geo-location of the WT determined in step 602. For example, the application creates a virtual field with the WT location being the center, an edge, or corner. The field may have any of various shapes, such as rectangle, circle, or oval, depending, for example, on the game or user preference. In some embodiments, the field dimensions are determined in the geo-gaming application at least in part using pre-established parameters. For example, the application may be pre-programmed to require that the playing field have a certain shape and/or size, such as the shape and size of an actual volleyball or tennis court.

For embodiments in which the processor the WT, in operating the gaming application, receives input from the respective players indicating geographic parameters of the first geographic playing field in step 604, at step 608, the application creates the field in accord with the input received in step 604. In some embodiments, in addition to automatic determination of parameters and/or input from the player, the processor may set geographic parameters of the playing field based in part on field parameters agreed to between the players. For example, the players may agree to use a larger field requiring them to move farther to protect their territories, which will cause them to exert more energy when playing. The players may also agree that the field of one of the players will be smaller, such as for scenarios in which one of the players is less agile (e.g., younger) or in an area less conducive to moving about. The gaming application may be configured so that agreements, such as those described above in this paragraph regarding field size, or other game parameters, may be reached by way of messaging between playing WTs. The messaging may be carried out by one or more messaging steps using the geocasting protocol described herein.

For embodiments in which the processor the WT, in operating the gaming application, receives the message indicating the geo-parameters of the field of play in step 606, at step 608, the application creates the field in accord with the geo-parameters in the message.

The processor of each WT may create a data packet including the geographic parameters of the geographic playing field established in the processor. In one embodiment, the data packet is a geocast data packet, having a location of the transmitting WT and a destination geocast region. In one contemplated embodiment, the data packet includes a target device-specific address (e.g., an IP address).

For embodiments in which the WT creates a geocast data packet for sharing the geographic parameters of its playing field, the WT geocasts the geocast data packet to the one or more destination geocast regions, having the one or more competing WTs, according to transmission heuristics of the tiered geocast protocol.

Display Field Area

The processor of each device, in operating the gaming application of the WT, in some embodiments presents to the player using the WT by way of a display of the WT, a rendering of the virtual playing field of the player using the WT and/or fields corresponding to WTs of one or more competitors. The processor may also cause the display to show a virtual representation of the player using the WT and/or of the other players, such as in relation to respective virtual game fields. The perspective displayed changes as the viewing player moves his/her WT, and the positions of the other players change as the geographic location of the other players change. A change of position of an WT is in some embodiments communicated by data in a geocast data packet transmitted to the other player(s).

In some embodiments, the geo-gaming application is configured to present the game via the display of the WT in one dimension. In some embodiments, the geo-gaming application is configured to present the game via the display of the WT in two or three dimensions.

In some embodiments, the geo-gaming application is configured to present the game in augmented reality. In these embodiments, visual game characteristics from the perspective of a player using a WT, such as the game object (e.g., ball or flying disc), the field, a virtual net or goal, and virtual players are presented against a backdrop of the actual environment of the player using the WT. The environment backdrop is received by the WT via, for example, a camera input, such as the image system 134 and/or video system 136 described above in connection with FIG. 1.

In a contemplated embodiment, the processor, operating an application of the WT, adjusts the image of the environment before or while it is presented to the user via the display. The application causing the adjusting may be the geo-gaming application or another application, such as one dedicated to video processing. By adjusting the visual before display, aesthetic appeal can be increased, and perceptibility of visual game characteristics (e.g., field and net) may be increased. As an example of adjusting, the application may cause the processor to approximate a very cloudy sky as all blue and a patchy lawn as green.

Initial Serve

For games in which players hit or throw a virtual game object, the processor operating the geo-gaming application of a serving WT receives an input from the player indicating a desire to hit or throw. The geo-gaming application may be configured to allow players to initiate service and move their virtual players in various ways. These ways include gestural inputs, such as manual selection of a button corresponding to starting, hitting, or throwing.

Player input controlling game actions could also be provided and received in other ways, such as via voice commands. For example, before or while virtually hitting or throwing the game object, the player could say, "loft," "spike," or "right spin." The processor would compute corresponding signals received via a microphone of the WT (e.g., microphone of audio I/O components 128 described above in connection with FIG. 1), and add corresponding data to the geocast data packet indicating movement characteristics of the game object.

Figure 7:
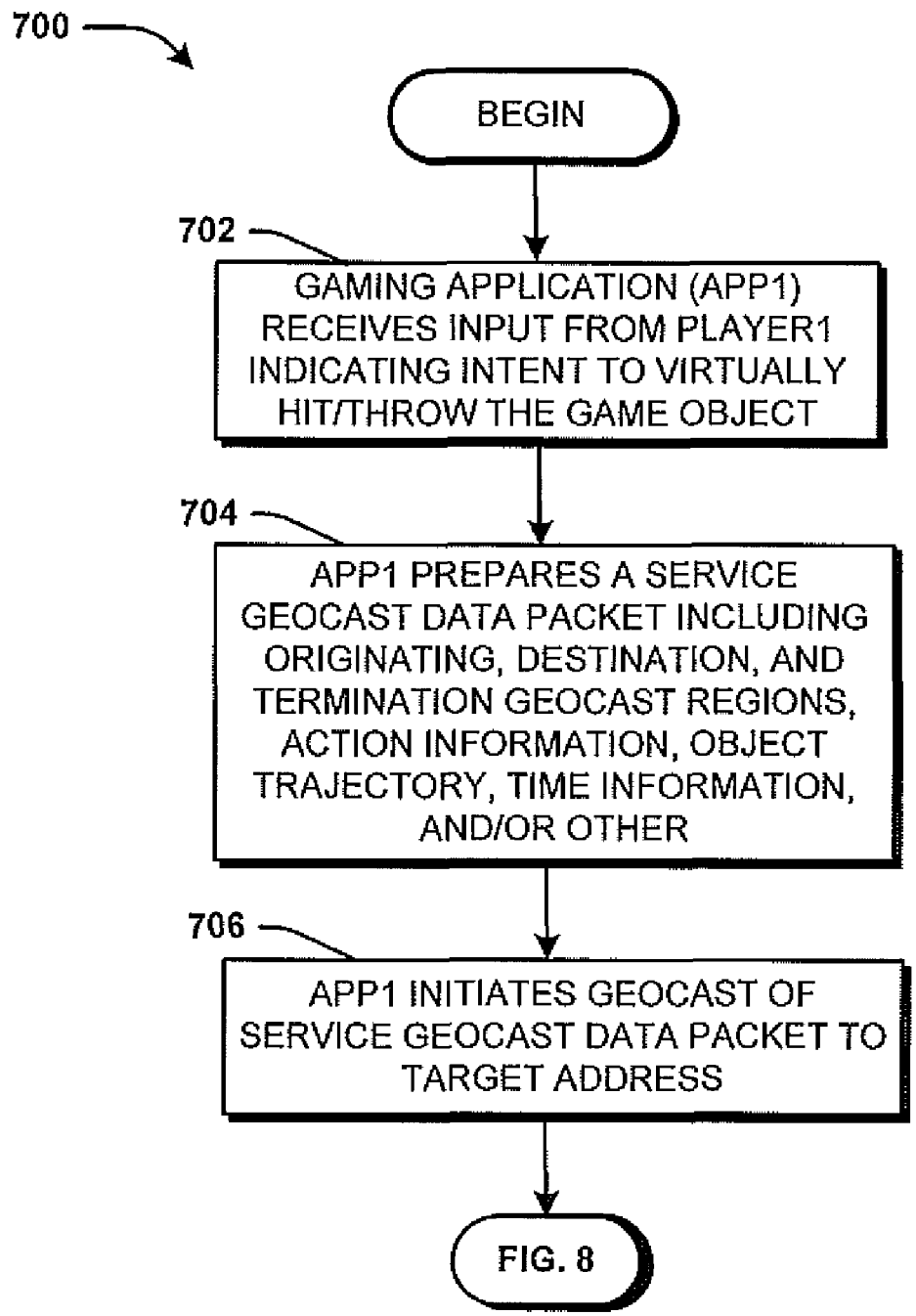
FIG. 7 illustrates an exemplary method for a wireless terminal preparing and transmitting a geocast data packet for transferring a simulated or virtual game object, according to an embodiment of the present disclosure.

FIG. 7 illustrates an exemplary method for serving a virtual game object. At step 702, the gaming application of the WT receives input from the player indicating the player's desire to hit or throw from motion of the player with the WT. Example inputs include gestural, voice, or movement of the WT, such as a swinging of a hand holding the WT. In one embodiment, the gaming application of the WT is programmed with default motions corresponding to hit types, such as moving a wrist of the hand holding the WT to the left to indicate a spike (i.e., high speed, straight) hit and to the left to indicate high lift. In some embodiments, a spike requires a jump and/or a downward swinging motion, like a spike move in volleyball.

In some embodiments, the player is able to program inputs to be associated with various types of hits or throws, such as gestures and/or voice inputs. The WT may be configured to sense and process such motions in a variety of ways, such as using an inertial unit or other sensor systems.

Upon indication of an action, such as hitting or throwing the virtual game object, calling timeout, etc., the processor operating the geo-game, at step 704, creates a geocast data packet corresponding to the action. The geocast data packet includes the geocast data required by the protocol for scalable tiered transmission, including originating geocast region, destination geocast region, and termination geocast region, as described above. The geocast data packet also includes an indication of the action being taken, such as the game object being hit/thrown and/or information regarding a trajectory of the game object. For games involving more than just a flight, such as tennis, including a bouncing of the game object, the gaming application may be configured so that data corresponding to the bounce is provided in the geocast data packet from the hitting/throwing WT.

The geo-gaming application is in some embodiments configured to only allow the allow players to virtually hit or throw the game object with default characteristics, such as trajectory and pace. The default characteristics may be random, as by the processor operating the gaming application of the WT randomly selecting a game object speed, or pace, and/or trajectory or arc, including a randomly selected impact point within the playing field of another player. In some embodiments, a player hits or throws according to default characteristics unless they provide input indicating a desire to hit or throw the game object in another way.

To add to the reality effect of the experience, game characteristics, such as trajectory and speed of the object are preferred in most embodiments to approximate real-time play, such as by the pace of the virtual game object matching the pace of the game object of a real-world game, such as volleyball, tennis, or catch with a ball, flying disc, etc. The gaming application may also be configured so that the processor causes game object movement, such as flight, to be displayed in a substantially real-time manner, so that it appears to a player toward which the game object is moving that an actual volleyball, for example, is coming toward their side of the court. The real-world experience is in some embodiments furthered by augmented-reality characteristics by which game play is shown against the real-world backdrop.

The processor receives user input indicating game object transfer characteristics. For example, a user may, in indicating a hit or throw, indicate a desire to spin or curve the game object. For geo-games in which the game object bounces, such as a virtual tennis game, the geocast data packet can include data about ball spin, which in addition to controlling trajectory before the bounce, may controls how the ball bounces, such as by controlling a trajectory and pace at which the game object moves following the bounce.

The player may indicate intention to control game object movement characteristics by, for example, providing one or more manual inputs, or motion of the WT, which is sensed by an inertial unit or other sensor system and provided to the processor. As an example, the player input, such as moving the WT, can indicate a high-loft hit or throw. The processor of the WT indicates a high-loft trajectory in the geocast data packet, such as by including in the packet data about a trajectory curve and/or a relatively long virtual flight time, or landing time farther off than would be the case with a more direct hit or throw. The player input may also indicate a desire for a substantially straight trajectory, such as a volleyball-style spike, or one curving laterally to the left or right.

The geocast data packet in some embodiments includes, with or separate from the trajectory data, data indicating an expected impact point—a location at which the virtual game object will virtually impact hit the ground if not intercepted by the WT to whose field the virtual game object has been directed, such as a point represented by geographic coordinates. The landing location data may take various forms, such as a geographic point or a position defined with respect to the boundaries of the receiving player's virtual game field.

In some embodiments, the gaming application is configured to allow the player to indicate a desired impact point, or an impact area, such as one of multiple portions (e.g., side, half, or quadrant) of the playing field of an opposing player. In some particular embodiments, the gaming application is configured to allow the player to identify the desired impact point of the virtual game object by, at the time they are launching the virtual game object moving their WT at a certain speed and/or direction (e.g., linear and/or angular) of movement. The application measures the movement parameter(s) (e.g., angle and speed) and determines the corresponding trajectory and/or impact point or area by models developed using physical simulations or by other calculations. For example, in use, the player, while hitting or throwing, may by gesture and/or input by voice to indicate that he/she desires the impact point to be in a first or second quadrant of the opposing player's game field, such as by saying "first" for a first quadrant, or by moving the WT forward slowly and slightly to the left to indicate a first, front-left quadrant of the opposing player's field, or forward more quickly and slightly to the right to indicate a fourth, rear-right quadrant.

The geocast data packet may also include time information, such as a time at which the game object was hit, caught, or thrown, or a time at which the virtual game object will virtually impact the ground if not intercepted by the WT to whose field the virtual game object was directed. Participating WTs, including at least the WTs participating in the game may operate on a common time standard, such as time in GPS signals, such as by setting on-board clocks of the respective WTs to match the common GPS time.

After creating the geocast data packet, the processor of the WT, at step 706, initiates geocast of the data packet according to the heuristics of the scalable tiered geocast protocol. As described herein regarding various embodiments, the heuristics include a determination of whether to transmit the geocast data packet on a first tier, short-range, network or on a second tier network, long-range, network. As describe above, intermediate WTs participating in the protocol may receive and retransmit, or not retransmit, the geocast data packet according to various variables considered in the geocast protocol described above.

Return of Virtual Game Object

Figure 8:
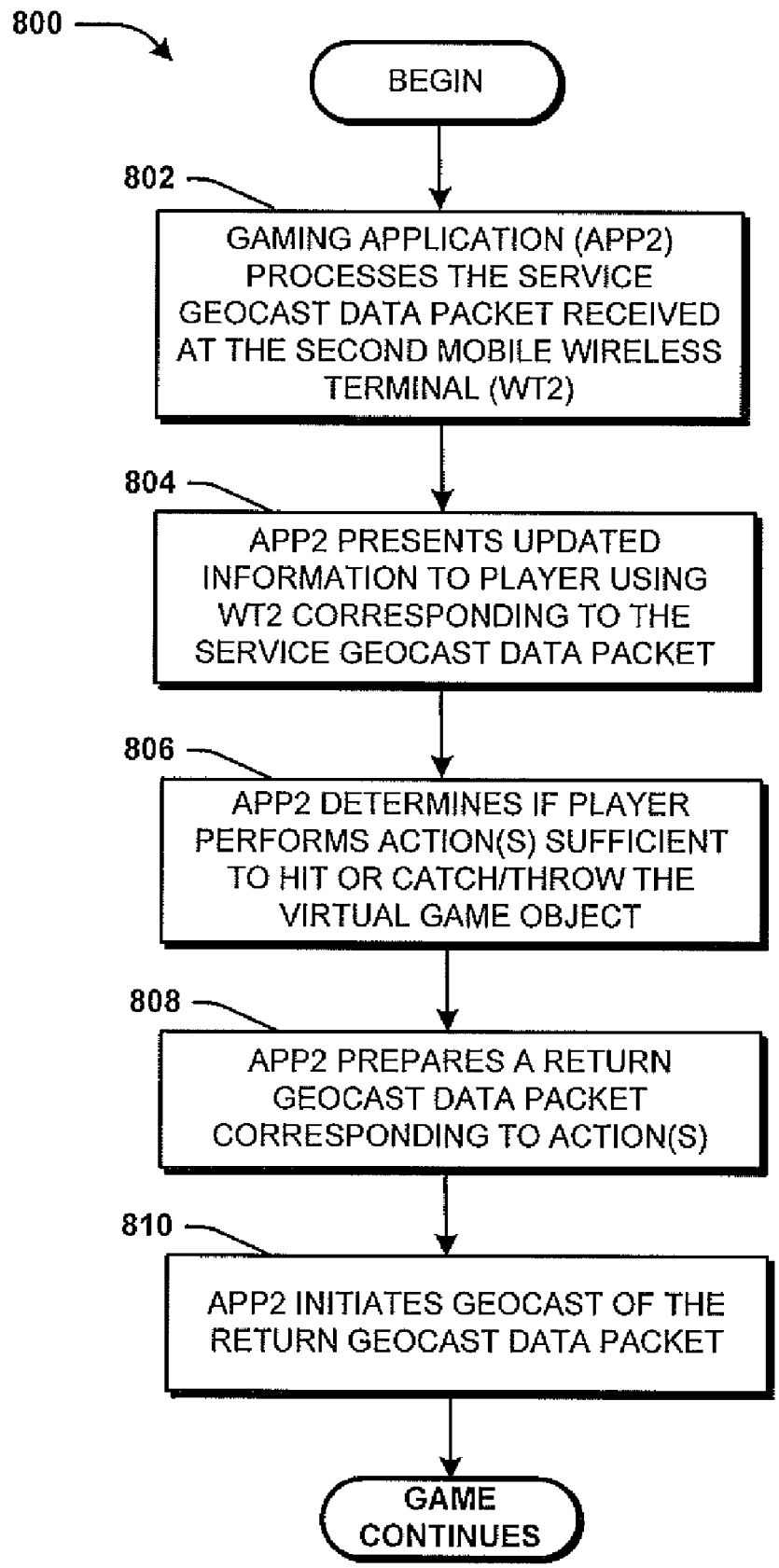
FIG. 8 illustrates an exemplary method for a wireless terminal receiving the virtual game object by way of the geocast data packet to receive and return the object via geocast data packet, according to an embodiment of the present disclosure.

FIG. 8 illustrates an exemplary method for receiving the game object virtually transferred to it via the geocast data packet. The method begins and, at step 802, the processor of the receiving WT, receiving the geocast data packet from the sending WT, processes the geocast data packet. At step 804, the processor of the receiving WT presents updated game action to the user of the receiving WT accordingly. For instance, the processor of the receiving WT causes the display of the WT to show the game object moving according to the data in the geocast data packet, such as at a certain trajectory and pace or speed. In some embodiments, the processor causes the display to show the virtual game object as if it is approaching a virtual player and/or the virtual game field associated with the receiving WT.

At step 806, the processor of the receiving WT determines if the player using the WT performs actions, such as positioning and moving of the receiving WT, sufficient to virtually hit, or catch and throw, the game object. The determination includes the processor obtaining a geographic location of the receiving WT at or generally at the time, provided in the geocast data packet, indicating a time at which the virtual game object will virtually touch the ground, and comparing the location to an impact location indicated in the geocast data packet for the virtual game object.

As part of getting the WT in the proper position to catch or hit the virtual game object, the player may make extreme movements, such as lunging, jumping or diving. The processor operating the gaming application in some embodiments of the present disclosure recognizes the extreme movement, such as by the nature of an accompanying acceleration sensed by an inertial unit or other sensor of the WT, and credits the player for performing the act (i.e., lunged, or jumped, or dove), such as by causing a corresponding virtual person to perform the act and/or allowing a hit or throw that is made possible by way of the act.

At step 808, the application of the receiving WT creates a geocast data packet corresponding to the response of the player. In some embodiments, the processor of the receiving WT, when it is determined that the receiving WT was at the right place at the right time to intercept the virtual game object from impacting the ground, automatically creates a return geocast data packet with data indicating a return hit, or catch and throw. In some embodiments, the processor provides data in the return geocast data packet regarding quality of a virtual return of the game object in relation to additional actions taken by the player, even after it has been determined that the player is in the right place at the right time to intercept the game object.

For example, the gaming application may be configured to require a player to indicate a hit, or catch and throw, by manual input and/or a movement of the WT, such as a swinging motion, which is sensed by an inertial unit, or other sensor system, and provided to the processor. At step 810, the return geocast data packet is transmitted from the WT according to the heuristics of the scalable tiered geocast protocol. The game continues as such, with the processor of the WTs participating in the game sharing geocast data packets indicating various virtual game actions.

Scoring

In various embodiments, one or more of the WTs participating in the game keeps track of game statistics, such as score. In some embodiments, each WT maintains the same statistics, such as a score card that is updated using data in geocast data packets throughout the game. When points are earned, as determined by the processor of any one or more WTs, an indication of change in game statistic, i.e., a score count, may be provided in a geocast data packet dedicated to notifying the other WT(s) of the change, or provided as a part of a geocast data packet also providing other information, such as an indication of a new serve of the virtual game object.

Statistics of the game are awarded depending on actions and rules specific to the game. For example, a score may be awarded when a processor of a receiving WT participating in the game determines that the present geographic location of the receiving WT does not bear a predetermined relationship to an impact location in the virtual field of the receiving WT.

Scoring may also be determined by way of WTs participating in the game geocasting data packets communicating that they did not catch hit the ball, including those to who's field the game object was not transmitted. In some embodiments, the gaming application is configured so that WTs determine when to send such "I did not get the game object" messages based on the expected time that the game object was to impact the ground someplace (e.g., immediately after or within a predetermined time after the impact time). In addition to indicating in a geocast data packet a score for one or more other players, or deducting a point from the player allowing the game object to virtually touch down, the processor of the WT may record such changes in statistics in a memory of the WT.

Figure 9:
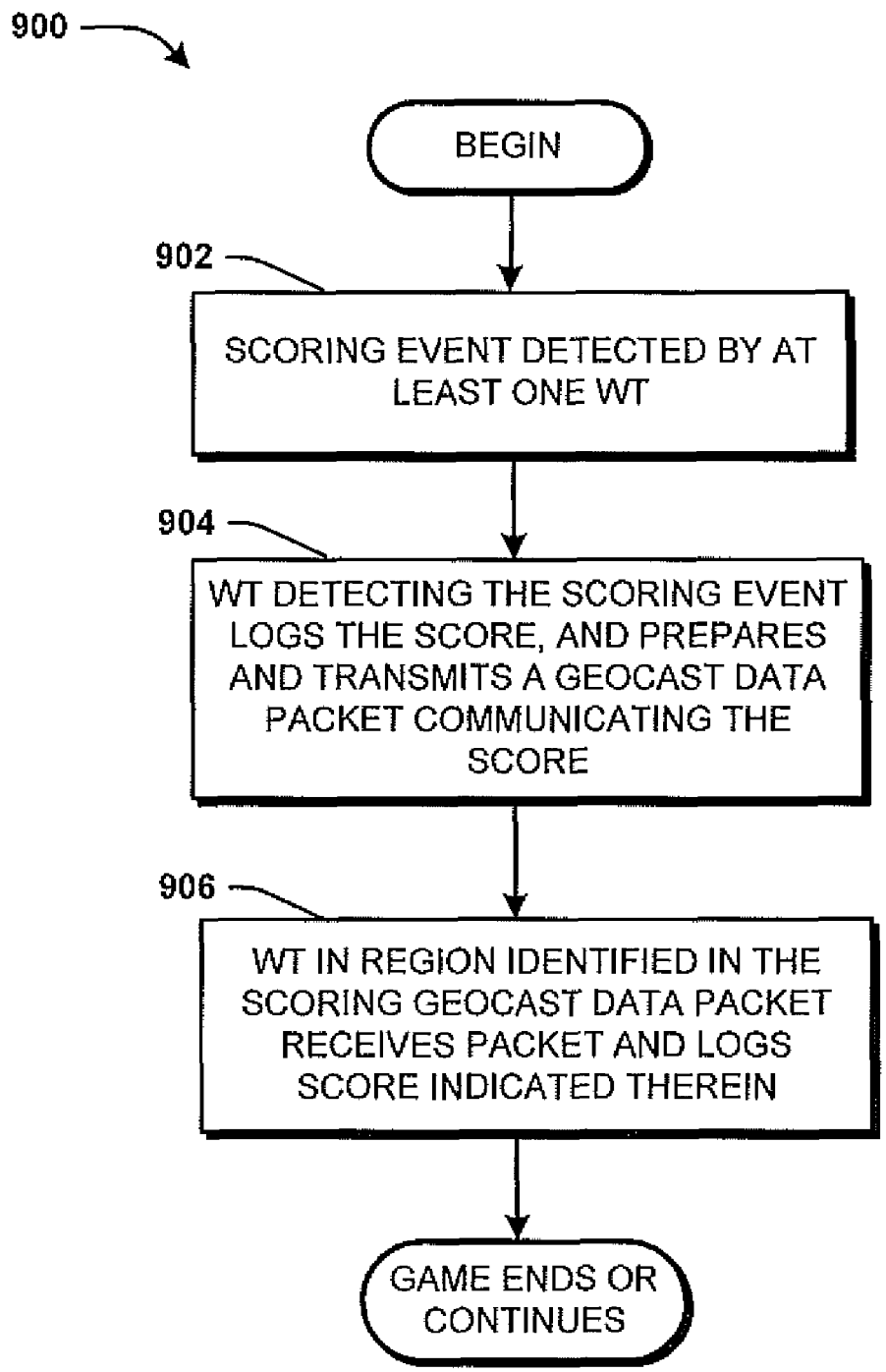
FIG. 9 illustrates an exemplary method for transmitting scoring information between wireless terminals taking part in the game by geocasting.

FIG. 9 illustrates a method 900 for transmitting scoring messages between WTs having the geo-gaming application using the geocast protocol. The method 900 begins and, at step 902, damage or another scoring event occurs and is detected by the processor running the gaming application of at least one of the WTs taking part in the game. As an example scoring event, a score can be earned by one player when they hit the virtual game object toward an impact point in an opposing player's virtual field, and the opposing player fails to intercept the object, allowing it to land at the impact point.

As described above, the processor of the gaming application of the WT detecting the score may be the processor of the WT to which the virtual object causing the score was hit. That receiving WT may detect the score by determining that the present geographic location of the receiving WT does not bear a predetermined relationship to the impact location, within the virtual field of the receiving WT, as identified in the geocast data packet that virtually transmitted the virtual object.

As also described above, the processor of the gaming application of the hitting WT detecting the score may be the processor of the WT that virtually hit the object causing the score. In this case, for example, scoring is determined by the hitting WT geocasting a data packet generating a data packet communicating the score when it does not receive a data packet indicating that the virtual object was not intercepted and hit toward a player's field.

At step 904, the gaming application of a WT determining that a score has been earned awards the score accordingly and transmits a scoring message communicating the score. As mentioned above, the scoring message may be a scoring geocast data packet dedicated to notifying the other WT(s) of the change, or a part of a geocast data packet also providing other information, such as an indication of a new serve of the virtual game object.

The processor, operating the gaming application, of the WT detecting the scoring event may address the scoring geocast data packet to the one or more destination geocast regions in which the other player(s) are located. The processor, operating the gaming application, may also be configured to address the geocast data packet to the defined field of one or more of the other players.

At step 906, the processor, operating the gaming application, of the WT(s) receiving the scoring geocast data packet records the score accordingly. The WT(s) receiving the scoring geocast data packet may also re-transmit (not shown) the scoring geocast data packet to a destination region corresponding to one or more other WTs taking part in the game. The WT re-transmitting as such may retransmit the data packet without changing the packet, or after amending it to include less and/or additional information. The method 900 may end.

Number of Players

In some contemplated embodiments, the geo-gaming application is configured to facilitated play by only one player. The geo-gaming application would in these embodiments, simulate one or more other players. The geo-game could still cause the player to move about their playing area and process player inputs described herein, such as changes in WT location and gesturing. In some particular embodiments, the game system includes the WT having the geo-gaming application and an unmanned device, such as a game server. The game server may be local, such as in the house of the player, or remote. The WT may connect to such a remote server in various ways, such as via the internet or a telecommunications network.

In some embodiments, the geo-gaming application is configured to facilitate play between more than two players. The number of players is not limited, as the geo-gaming system of the present disclosure, by implementing the scalable tiered geocast protocol, could accommodate tens, hundreds, or even more players at once participating across various distances.

As a simple example, the geo-game may be occasioned between four players being in New York, Paris, San Francisco and Montreal. Players may indicate to which other player field they are virtually hitting or throwing the virtual game object by any of a variety of inputs. A player in New York to which the game object is moving, may run to the geographic location corresponding to where their display shows them that the virtual game object will be approaching the ground, and when the game object and they are there, indicate a desire to hit or throw the game object toward the field of the player in Paris by appropriate input.

As an example, the player may select a button, or a visual item on the display of their WT indicating a desire to hit or throw toward the field of the player in Paris. The player may also swing the WT in a manner to indicate their desire to hit the virtual game object generally east, toward the player in Paris, as opposed to swinging the WT toward the north to indicate a hit or throw toward Montreal, or toward the west for San Francisco.

In some embodiments of the present disclosure, the geo-gaming application allows a player to geocast multiple distinct data packets representing transfer (e.g., hit or throw) of distinct virtual game objects. These geocasts may occur simultaneously or generally simultaneously. A player may also affect transfer of more than one game object in scenarios in which multiple game objects are in play, in response each object arriving to them.

Multiple Game Objects

In one contemplated embodiment, the geo-gaming application is configured to enable players to split a virtual game object into two or more divisions. Or multiple game objects may be introduced at various times by the same or various players.

Regarding splitting, the geo-gaming application can be configured so that the player can by gesture, such as finger selection, wrist movement, and/or otherwise (e.g., voice), cause the game object to split. The player may also in these ways indicate flight characteristics (e.g., toward which playing field, trajectory and pace) for one or more of the resulting game objects. The processor operating the geo-gaming application then creates and geocasts the multiple distinct geocasting data packets accordingly.

Team Play

The geo-gaming application is in some embodiments configured to enable play between two or more teams of players using their respective WTs. Players on a team may be co-located or remote. For example, the WTs of two players in a park in New York may be assigned a game field having the same location and dimensions and a hit by either of them represents a hit by their team, as in team volleyball or doubles tennis. The team may play against the computer (i.e., the geo-gaming application in one or both of their devices), a single other player, or another team such as a team of two positioned in a park in London.

As another example, the geo-gaming application may be configured to associate players being remote to each other with the same team. For instance, a player in New York may be on the same team as a player in Montreal, and they may play against a team of two, one being in San Francisco and one being in London.

In some embodiments of the geo-game, players on the same team being remote to each other still share a common virtual game field. Though the players in these embodiments stand in different places, the processors operating the geo-gaming application on their WTs consider them to be virtually positioned on the same field.

In other embodiments of the game, players on the same team being remote to each other have respective game fields. Thus, the team with the player in New York and Montreal may hit or throw the virtual game object to each other and to the fields of the opposing team in San Francisco and London. If the game object touches down in the virtual game field of the player in San Francisco or the field of the player in London, the New York/Montreal team would be awarded a point, and vice versa.

The gaming application may be configured to assign a particular communications device as a proxy. In some embodiments, the proxy device is one of the WTs on a team. In one embodiment, the team may identify a non-playing device as the proxy, such as a laptop computer positioned outside of the playing field, or a WT of a friend or fan positioned adjacent the field.

In some embodiments, the geo-gaming system is arranged so that the proxy device geocasts every data packet from a team. For example, when a first player of a team of five players in a park moves to the game object in time and provides sufficient input to his/her WT to indicate a return hit, or catch throw, indication of the hit or catch/throw would be transmitted to the proxy, which would then geocast an appropriate data packet to the other team(s) according to the heuristics of the scalable tiered geocast protocol.

In some embodiments, the proxy device is appointed to perform other tasks for the team, such as receiving and processing incoming geocast data packets for sharing with the team, and tracking game statistics, such as score on behalf of the team.

General Summary

The geo-gaming system of the present disclosure, through geo-gaming and geographic messaging using a scalable tiered geocast protocol, such as the MANET, enables connection between physical world locations and actions, and virtual game locations and actions, in a way that is impossible or impractical to mimic in substantial real time otherwise.

Another characteristic of the present system is physical activity. As described above, players using many home gaming systems are tethered to a game console, or otherwise limited to relatively-slight movements in place or in a room. The present geo-gaming system allows players to create custom-sized playing areas to allow as much or little physical exertion as desired. And as described above, in many embodiments, the gee-game simulates a real-world type of game, such as tennis or volleyball. As such, and due to the real-time nature of the system, the players may experience exercise similar in quality to that occasioned during a comparable real-world game, such as an actual game of tennis or volleyball.

While the geo-gaming system of the present disclosure is described primarily in connection with relatively simple game formats, such as those relating to known games like volleyball, catch, or tennis, to facilitate description of inventive concepts, the teachings of the present disclosure—including geo-gaming, in real time, with augmented reality, using geographic messaging according to a scalable tiered geocast protocol—can be readily applied to more complex game formats, such as football, lacrosse, ultimate (the active sport in which teams score by advancing a flying disc), as well as non-sports games and competition, such as small or large-scale military simulations and multiplayer adventure geo-games.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for transmitting a virtual game object from a first player to a second player of a real-time geo-game using geocast messaging according to a scalable tiered geocast protocol, the method comprising:
  a first processor of a first wireless terminal (WT) receiving a first action input from a first user and, in response to receiving the first action input:
    generating a first geocast data packet for sending the virtual game object toward a second WT, the first geocast data packet including:
      a first destination geocast region including the second WT; and
      first movement information indicating first movement characteristics of the virtual game object; and
    geocasting the first geocast data packet to the first destination geocast region according to transmission heuristics of the scalable tiered geocast protocol.

2. The method of claim 1, further comprising at least one intermediate WT receiving and, according to the transmission heuristics of the tiered geocast protocol, retransmitting the first geocast data packet.

3. The method of claim 1, further comprising the first processor causing a display of the first WT to show a representation of at least one virtual game characteristic selected from a group of virtual game characteristics consisting of:
  (i) a portion of a first playing field associated with the first WT;
  (ii) a portion of a second playing field associated with the second WT;
  (iii) the first player moving with respect to the first playing field, and
  (iv) the second player moving with respect to the second playing field.

4. The method of claim 3, wherein the first processor, in causing the display of the first WT to show the representation of at least one virtual game characteristic, shows the characteristics with representation of an actual environment in which the first WT is being operated to create an augmented reality experience for the first user using the first WT.

5. The method of claim 1, further comprising a second processor, of the second WT:
  receiving the first geocast data packet; and
  determining if a present geographic location of the second WT bears a predetermined relationship to a first impact location provided in the first movement information.

6. The method of claim 5, wherein:
  the second WT includes a second memory; and
  the method further comprises the second processor, if the second processor determines that the present geographic location of the second WT does not bear the predetermined relationship to the first impact location, performing at least one step of:
    (i) recording a score for the first WT in the second memory; and
    (ii) the second processor including, in a subsequent data packet, indication of the score for the first WT, and geocasting the subsequent data packet to the first WT according to transmission heuristics of the scalable tiered geocast protocol.

7. The method of claim 6, wherein the second processor, in including, in the subsequent data packet, indication of the score for the first WT, and geocasting the subsequent data packet to the first WT according to transmission heuristics of the tiered geocast protocol, determines whether to transmit on a first tier network or a second tier network, and the method further comprises: the first processor receiving the subsequent data packet from the second WT, and the first processor recording the score for the first WT in a first memory of the first WT.

8. The method of claim 5, further comprising:
the second WT, in response to the second processor determining that the present geographic location of the second WT bears the predetermined relationship to the first impact location, returning the virtual game object toward the first WT, including the second processor:
generating a second geocast data packet for returning the virtual game object toward the first WT, the second geocast data packet including:
a second destination geocast region including the first WT; and
second movement information indicating second movement characteristics of the virtual game object.

9. The method of claim 8, wherein:
the second processor, in returning the game object toward the first WT:
receives input corresponding to a second action input from a second user, using the second WT, the input from the second user determining at least one of a trajectory and a pace at which the game object will virtually translate toward a second impact location; and
the second processor, in generating the second geocast data packet, includes in the second geocast data packet information indicating at least one of the trajectory and the pace.

10. The method of claim 9, wherein the second WT includes an inertial measurement unit sensing motion of the second WT, and the second processor, in receiving input corresponding to the second action, receives input from the inertial measurement unit corresponding to a movement of the second WT caused by the second user.

11. The method of claim 9, wherein the input from the second user causes the second processor to include in the second data packet trajectory information representing one of:
a laterally-curving trajectory for the game object toward a second impact location; and
a substantially straight trajectory for the game object toward the second impact location.

12. The method of claim 11, further comprising the first processor causing a display of the first WT to show a representation of the virtual game object moving according to the trajectory information toward the second impact location.

13. The method of claim 1, further including:
the first processor receiving a second action input from the first user and, in response to receiving the second action input:
generating a second geocast data packet for sending the virtual game object toward a third WT, the second geocast data packet including:
a third destination geocast region including the third WT and differing from the first destination geocast region and the second geocast region; and
third movement information indicating third movement characteristics of the virtual game object; and
geocasting the third geocast data packet according to transmission heuristics of the tiered geocast protocol, including determining on which network tier to transmit.

14. A wireless terminal comprising:
a processor; and
memory coupled to the processor, the memory having executable instructions stored thereon that when executed by the processor cause the processor to effectuate operations comprising:
receiving a first action input from a first user of the wireless terminal and, in response to receiving the first action input:
generating a first geocast data packet for sending a virtual game object toward a second wireless terminal, the first geocast data packet including:
a first destination geocast region including the second wireless terminal; and
first movement information indicating first movement characteristics of the virtual game object; and
geocasting the first geocast data packet to the first destination geocast region according to transmission heuristics of a scalable tiered geocast protocol.

15. The wireless terminal of claim 14, the operations further comprising:
causing a display of the wireless terminal to show a representation of at least one virtual game characteristic comprising at least one of:
a portion of a first playing field associated with the wireless terminal;
a portion of a second playing field associated with a second wireless terminal;
a first player moving with respect to a first playing field, or
a second player moving with respect to a second playing field.

16. The wireless terminal of claim 15, wherein causing the display of the wireless terminal to show the representation of at least one virtual game characteristic, shows a representation of an actual environment in which the wireless terminal is being operated to create an augmented reality experience for the first user using the wireless terminal.

17. A memory having executable instructions stored thereon that when executed by a processor cause the processor to effectuate operations comprising:
receiving a first action input from a first user of a first wireless terminal and, in response to receiving the first action input:
generating a first geocast data packet for sending a virtual game object toward a second wireless terminal, the first geocast data packet including:
a first destination geocast region including the second wireless terminal; and
first movement information indicating first movement characteristics of the virtual game object; and
geocasting the first geocast data packet to the first destination geocast region according to transmission heuristics of a scalable tiered geocast protocol.

18. The memory of claim 17, the operations further comprising:

causing a display of the first wireless terminal to show a representation of at least one virtual game characteristic comprising at least one of:
- a portion of a first playing field associated with the first wireless terminal;
- a portion of a second playing field associated with the second wireless terminal;
- a first player moving with respect to a first playing field, or
- a second player moving with respect to a second playing field.

19. The memory of claim 18, wherein causing the display of the first wireless terminal to show the representation of at least one virtual game characteristic, shows a representation of an actual environment in which the first wireless terminal is being operated to create an augmented reality experience for the first user using the first wireless terminal.

* * * * *

UNITED STATES PATENT AND TRADEMARK OFFICE
CERTIFICATE OF CORRECTION

PATENT NO. : 8,355,410 B2
APPLICATION NO. : 12/835385
DATED : January 15, 2013
INVENTOR(S) : Robert J. Hall Page 1 of 1

It is certified that error appears in the above-identified patent and that said Letters Patent is hereby corrected as shown below:

On the Title Page,
Item (56) References Cited
OTHER PUBLICATIONS:
Page 2, column 1, http://askville.amazon.com, reference, delete
"http://askville.amazon.com/Wi-games-play-Internet-Family/AnswerViewer.do?requestId=6796582 (2007)." and insert
-- http://askville.amazon.com/Wii-games-play-Internet-Family/AnswerViewer.do?requestId=6796582 (2007). --.

Signed and Sealed this
Twenty-fifth Day of June, 2013

Teresa Stanek Rea
*Acting Director of the United States Patent and Trademark Office*